United States Patent
Ohkubo et al.

(10) Patent No.: US 12,008,376 B2
(45) Date of Patent: Jun. 11, 2024

(54) INFORMATION PROCESSING SYSTEM AND INFORMATION PROCESSING METHOD

(71) Applicant: Hitachi, Ltd., Tokyo (JP)

(72) Inventors: Keiko Ohkubo, Tokyo (JP); Yu Nakata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 140 days.

(21) Appl. No.: 17/691,212

(22) Filed: Mar. 10, 2022

(65) Prior Publication Data

US 2023/0009759 A1   Jan. 12, 2023

(30) Foreign Application Priority Data

Jul. 8, 2021   (JP) .................................. 2021-113610

(51) Int. Cl.
*G06F 9/38* (2018.01)
*G06F 9/48* (2006.01)
*G06F 9/50* (2006.01)

(52) U.S. Cl.
CPC .......... *G06F 9/3887* (2013.01); *G06F 9/4862* (2013.01); *G06F 9/5038* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 5,170,482 A * | 12/1992 | Shu | ................... | G06F 15/17343 712/12 |
| 8,589,931 B2 * | 11/2013 | Barsness | ................ | G06F 1/3203 709/224 |
| 2009/0055630 A1 * | 2/2009 | Isshiki | .................. | G06F 11/004 712/216 |
| 2012/0310523 A1 * | 12/2012 | Delling | .............. | G01C 21/3446 701/411 |
| 2018/0027006 A1 * | 1/2018 | Zimmermann | ..... | H04L 63/0227 726/11 |
| 2021/0405915 A1 * | 12/2021 | Agarwal | ............... | G06F 3/0604 |

FOREIGN PATENT DOCUMENTS

JP   2017-016494 A   1/2017

OTHER PUBLICATIONS

J. Dean and S. Ghemawat, "MapReduce: Simplified Data Processing on Large Clusters," OSDI, 2004.

* cited by examiner

*Primary Examiner* — Michael Sun
(74) *Attorney, Agent, or Firm* — Baker Botts L.L.P.

(57) ABSTRACT

One or more information processing apparatuses to process information are provided. The information processing apparatus includes: a division function that divides processing information into a plurality of pieces, under a division condition that designates parallel processing among the information processing apparatuses, the processing information indicating a data processing procedure from a plurality of start points to one or more end points; a determination function that uniquely determines an assignee of each piece of the processing information divided by the division function, as any of the information processing apparatuses; and an execution function that executes a process in the information processing apparatus determined by the determination function.

15 Claims, 22 Drawing Sheets

FIG. 8

| AREA ID | DATA FLOW PROCESSING APPARATUS IP ADDRESS |
|---|---|
| Area-1 | aaa. |
| Area-2 | bbb |
| | |

FIG. 9

| TRANSFER STEP ID | TRANSFER-SOURCE AREA ID | TRANSFER-SOURCE IP ADDRESS | TRANSFER-DESTINATION AREA ID | TRANSFER-DESTINATION IP ADDRESS | TRANSFER STEP TYPE | CONNECTION ID TO COUPLING DESTINATION | INTERMEDIATE DATA FORMAT |
|---|---|---|---|---|---|---|---|
| TRANSFER 1 | Area-1 | aaa | Area-2 | bbb | TRANS-MISSION | S01 | |
| | | | | | | | |

901 902 903 904 905 906 907 908

607

FIG. 17
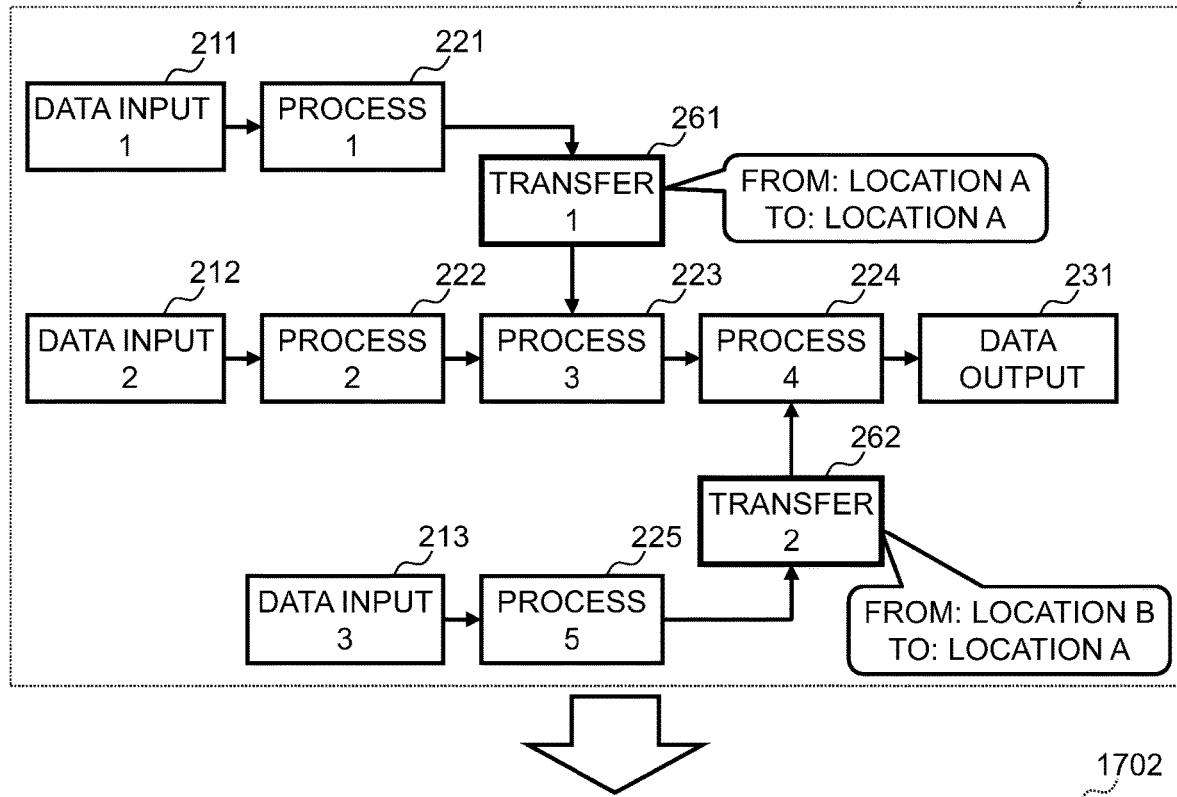
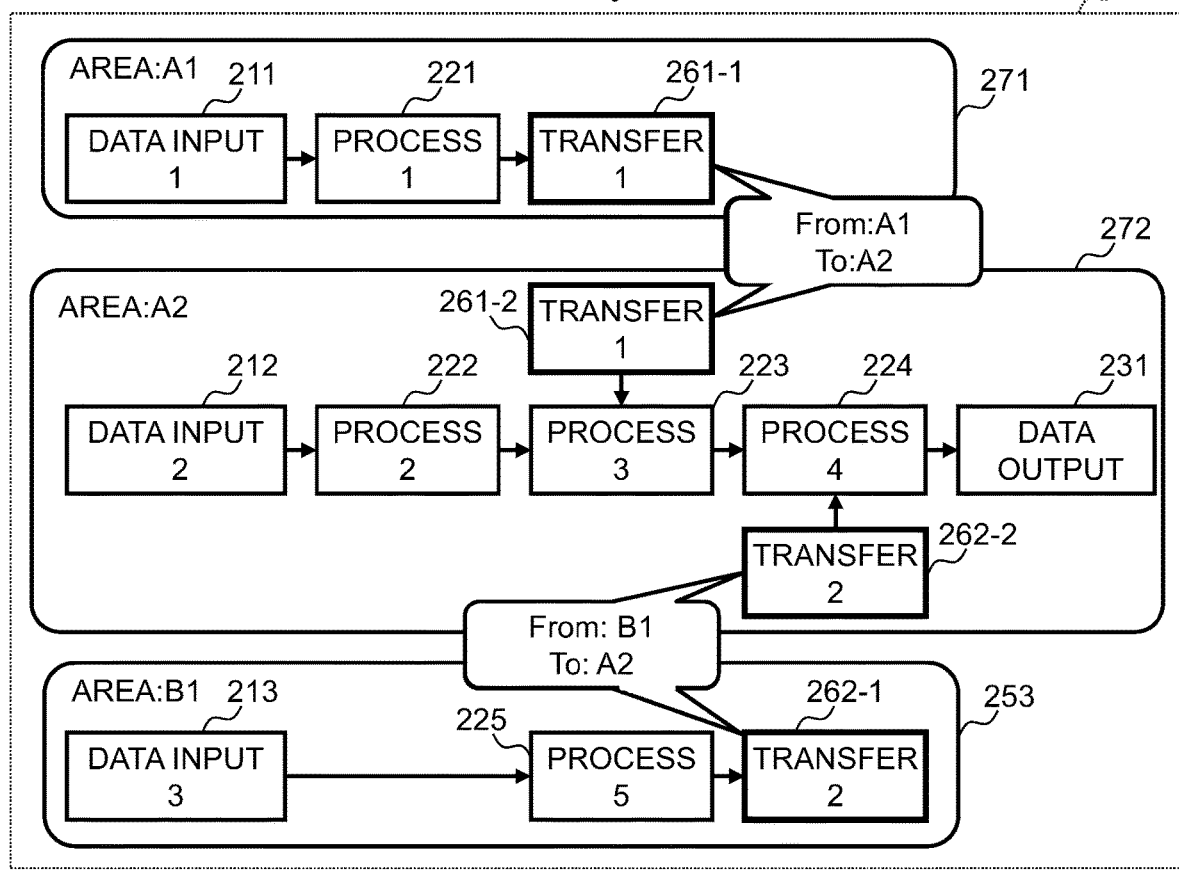

FIG. 20

| TRANSFER STEP ID | TRANSFER-SOURCE AREA ID | TRANSFER-DESTINATION AREA ID | TRANSFER STEP TYPE | CONNECTION ID TO INTERMEDIATE DATA TRANSFER PROCESS | INTERMEDIATE DATA FORMAT |
|---|---|---|---|---|---|
| TRANSFER 1 | Area-1 | Area-2 | TRANSMISSION | t01 | |
| | | | | | |

| TRANSFER STEP ID 2101 | CONNECTION ID TO DATA FLOW EXECUTION PROCESS 2102 | CONNECTION ID TO COUPLING DESTINATION 2103 | TRANSFER SOURCE IP ADDRESS 2104 | TRANSFER DESTINATION IP ADDRESS 2105 | TRANSFER STEP TYPE 2106 |
|---|---|---|---|---|---|
| TRANSFER 1 | t11 | s01 | aaa | bbb | TRANSMISSION |

1907

INFORMATION PROCESSING SYSTEM AND INFORMATION PROCESSING METHOD

CROSS-REFERENCE TO PRIOR APPLICATION

This application relates to and claims the benefit of priority from Japanese Patent Application number 2021-113610, filed on Jul. 8, 2021 the entire disclosure of which is incorporated herein by reference.

BACKGROUND

The present invention generally relates to an information processing system and an information processing method in a distributed environment.

Data-driven decision making has become more important, and analysis that crosses multiple data items has become required. Widely spread IoT (Internet of Things) increases the amount of data. As a method of processing a large amount of data at high speed, a method called MapReduce is generally known. As described in Non-Patent Literature 1, MapReduce divides data, distributes the divided data items to a plurality of information processing apparatuses called workers, causes the workers to execute processes for allocated data items, and aggregates the execution results. MapReduce executes the same process in a parallel distributed manner, thereby improving the speed of the process. Patent Literature 1 discloses a method of allowing an information processing apparatus having accepted a request to divide a series of processes in a flow into parallel processable units on the basis of the dependency between the processes, to designate information processing apparatuses scheduled to execute processes, and to make copies of the processes for the information processing apparatuses, and of allowing these apparatuses to execute the processes in parallel.

Patent Literature 1: Japanese Patent Laid-Open No. 2017-16494

Non-Patent Literature 1: J. Dean and S. Ghemawat, "MapReduce: Simplified Data Processing on Large Cluster", OSDI, 2004.

SUMMARY

Among processing programs (hereinafter called data flows) that execute a series of processes from a start point (i.e., input) serving as an input process portion to an end point (i.e., output) serving as an output process portion, for example, a data flow that has multiple start points residing in one information processing apparatus can sometimes have a bottleneck thereat. Non-Patent Literature 1 and Patent Literature 1 divide processes for input data and allow multiple information processing apparatus to execute the divided processes, but do not consider parallelization of different processes for different data items, or merging of the processes. Merging of the processes requires information on an information processing apparatus serving as a merger destination, a merger point, a data format for a merger process and the like. Before execution of the data flow, these pieces of information are required to be shared among the information processing apparatuses that perform merger. Unfortunately, according to the conventional art, means required to share these pieces of information are not provided, and merger of data items after the parallel processing cannot be achieved.

The present invention has been made in view of such a background, and has an object to achieve parallelization of data processing from multiple start points to one or more end points, and a merger of data items after parallel processing, in a distributed environment.

To achieve the object described above, the present invention includes one or more information processing apparatuses to process information. The information processing apparatus includes: a division function that divides processing information into a plurality of pieces, under a division condition that designates parallel processing among the information processing apparatuses, the processing information indicating a data processing procedure from a plurality of start points to one or more end points; a determination function that uniquely determines an assignee of each piece of the processing information divided by the division function, as any of the information processing apparatuses; and an execution function that executes a process in the information processing apparatus determined by the determination function.

According to the present invention, in a distributed environment, parallelization of data processing from multiple start points to one or more end points, and a merger of data items after parallel processing can be achieved, which can resultantly improve the data processing speed.

BRIEF DESCRIPTION OF THE DRAWINGS

FIG. 8 is a configuration diagram showing a configuration example of area assignment information according to Embodiment 1;

FIG. 9 is a configuration diagram showing a configuration example of transfer step information according to Embodiment 1;

FIG. 17 is a configuration diagram showing a division example of the data flow according to Embodiment 2;

FIG. 20 is a configuration diagram showing an example of a configuration of transfer step information according to Embodiment 4;

FIG. 21 is a configuration diagram showing an example of a configuration of connection information according to Embodiment 4;

DESCRIPTION OF EMBODIMENTS

Figure 1:
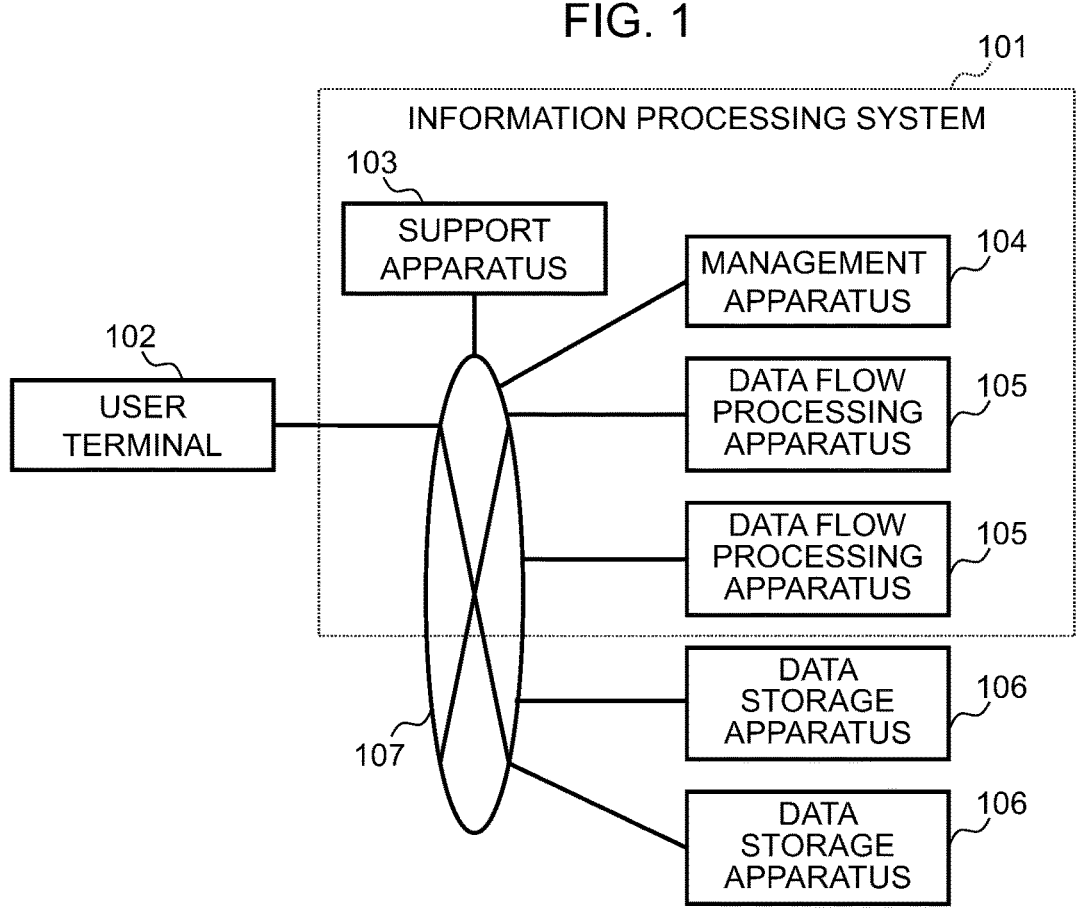
FIG. 1 is a schematic configuration diagram showing an example of a schematic configuration of an information processing system according to Embodiment 1.

Hereinafter, referring to the drawings, embodiments of the present invention are described.

Embodiment 1

Embodiment 1 is described with reference to FIGS. 1 to 15. In this embodiment, an example is described where an information processing system 101 including a plurality of information processing apparatuses executes a data flow having a plurality of start points.

FIG. 1 is a schematic configuration diagram showing an example of a schematic configuration of an information processing system according to Embodiment 1. In FIG. 1, the information processing system 101 includes, for example, a support apparatus 103, a management apparatus 104 and multiple data flow processing apparatuses 105, and is coupled to a user terminal 102 and multiple data storage apparatuses 106 via a network 107. The user terminal 102, the support apparatus 103, the management apparatus 104, each data flow processing apparatus 105 and each data storage apparatus 106 are coupled to each other via the communication network 107. The information processing system 101 distributes, to each data flow processing apparatus 105, information on a data flow received from the user terminal 102, and executes processes.

The communication network 107 may include, for example, wired or wireless communication infrastructures, such as a LAN (Local Area Network), a WAN (Wide Area Network), the Internet, an intranet, a dedicated line, a cellular network, or an optical fiber.

The user terminal 102 may be an information processing apparatus having a data flow designing function provided with a GUI (Graphical User Interface) generates information on a data flow describing a series of processes from input to output of data, on the basis of an operation of a user, and transmits the generated information on the data flow to the network 107.

When the support apparatus 103 receives, via the network 107, the information on the data flow transmitted from the user terminal 102, this apparatus accepts registration of the received information, and distributes the accepted information on the data flow to each data flow processing apparatus 105.

In a case where the data flow is divided by each data flow processing apparatus 105, the management apparatus 104 is used to allocate the data flow processing apparatus 105 for executing a process for the corresponding divided data flow. The allocation process is described later.

Upon receipt of the information on the data flow distributed from the support apparatus 103 via the network 107, each data flow processing apparatus 105 divides the information into a plurality of areas on the basis of a transfer step recorded in the data flow, determines the data flow processing apparatus 105 that is assigned execution of the area on an area-by-area basis, and stores information (i.e., area assignment information) indicating a combination between the corresponding area and the data flow processing apparatus 105 assigned this area, as information to be shared among the data flow processing apparatuses 105. Subsequently, each data flow processing apparatus 105 executes the process belonging to the assigned area. Note that the aera is defined as a range in which the information on the data flow is recorded and which is executed by a single data flow processing apparatus 105.

Each data storage apparatus 106 is, for example, a typical database, records various data items, and reads data upon requests issued by various information processing apparatuses. Note that each data storage apparatus 106 is only required to have a data storing function and data reading function, and is not necessarily a database. The apparatus may be included in the information processing system 101.

The user terminal 102, the support apparatus 103, the management apparatus 104, each data flow processing apparatus 105, and each data storage apparatus 106 may be information processing resources (e.g., servers), may be configured using, for example, virtual information processing resources, such as cloud servers or containers in a cloud system, or physical information processing apparatuses. The number of these apparatuses is not limited to that shown in the diagrams, and may be one or two or more. A certain apparatus may concurrently have a function of another apparatus.

Figure 2:
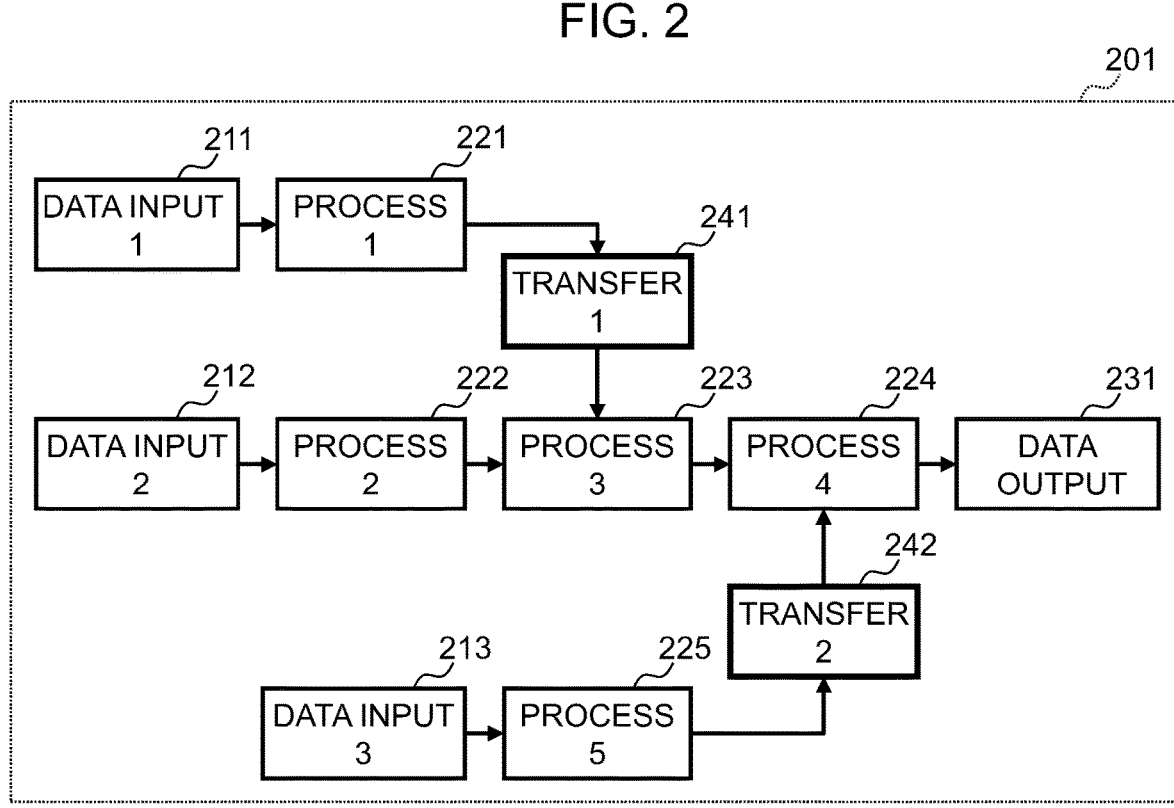
FIG. 2 is a configuration diagram showing an example of a data flow according to Embodiment 1.

FIG. 2 is a configuration diagram showing an example of a data flow according to Embodiment 1. In FIG. 2, the user terminal 102 creates information on a data flow 201 in which a series of data processing from input to output of data is described, on the basis of an operation of the user. The data flow 201 is information generated by the user terminal 102 on the basis of the operation of the user, and includes: a first data input (i.e., "DATA INPUT 1") 211, a second data input (i.e., "DATA INPUT 2") 212 and a third data input (i.e., "DATA INPUT 3") 213, as data input parts serving as start points for data input; a first process (i.e., "PROCESS 1") 221 to fifth process (i.e., "PROCESS 5") 225, as processing parts for sequentially executing data processing including data statistical processing and data anonymization process; data output 231 as a data output part serving as an end point for outputting data; and a first transfer step (i.e., "TRANSFER 1") 241 and a second transfer step (i.e., "TRANSFER 2") 242, as transfer parts that are switching points of the data flow processing apparatus 105, are disposed between certain processing parts, and transfer data between the processing parts. Here, the information on the data flow 201 is configured as processing information that indicates data processing procedures from a plurality of start points to one end point.

The first transfer step (i.e., "TRANSFER 1") 241 is inserted by an operation by the user as a transfer step that couples the first process (i.e., "PROCESS 1") 221 and the third process (i.e., "PROCESS 3") 223 to each other, and the second transfer step (i.e., "TRANSFER 2") 242 is inserted by an operation by the user as a transfer step that couples the fifth process (i.e., "PROCESS 5") 225 and the fourth process (i.e., "PROCESS 4") 224 to each other.

In the data flow 201, data input into the first data input (i.e., "DATA INPUT 1") 211 is subjected to statistical processing and the like by the first process (i.e., "PROCESS 1") 221, and is subsequently transferred to the third process (i.e., "PROCESS 3") 223 via the first transfer step (i.e., "TRANSFER 1") 241. Data input into the second data input (i.e., "DATA INPUT 2") 212 is subjected to statistical processing and the like by the first process (i.e., "PROCESS 2") 222, and subsequently output to the third process (i.e., "PROCESS 3") 223. In the third process (i.e., "PROCESS 3") 223, the data transferred from the first transfer step (i.e., "TRANSFER 1") 241, and the data input from the second process (i.e., "PROCESS 2") 222 are collectively subjected to statistical processing and the like, and subsequently output to the fourth process (i.e., "PROCESS 4") 224. Data input into the third data input (i.e., "DATA INPUT 3") 213 is subjected to statistical processing and the like by the fifth process (i.e., "PROCESS 5") 225, and subsequently transferred to the fourth process (i.e., "PROCESS 4") 224 via the second transfer step (i.e., "TRANSFER 2") 242. In the fourth process (i.e., "PROCESS 4") 224, the data transferred from the second transfer step (i.e., "TRANSFER 2") 242, and the data input from the third process (i.e., "PROCESS 3") 223 are collectively subjected to statistical processing and the like, and subsequently output to the data output 231.

Figure 3:
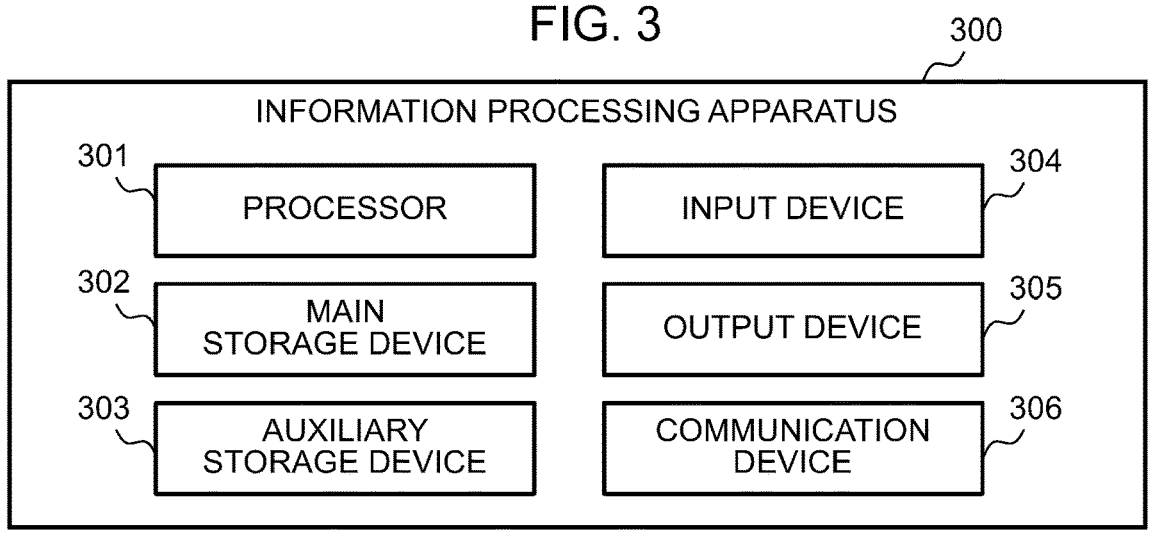
FIG. 3 is a configuration diagram showing a hardware configuration example of an information processing apparatus according to Embodiment 1.

FIG. 3 is a configuration diagram showing a hardware configuration example of the information processing apparatus according to Embodiment 1. In FIG. 3, the information processing apparatus 300 can be used as apparatuses that are the user terminal 102, the support apparatus 103, the management apparatus 104, the data flow processing apparatuses 105, and the data storage apparatuses 106. Here, the information processing apparatus 300 includes: for example, a processor 301, a main storage device 302, an auxiliary storage device 303, an input device 304, an output device 305, and a communication device 306. These elements are communicably coupled to each other via communication means, such as a bus, not shown.

The processor 301 may be, for example, a CPU (Central Processing Unit) or an MPU (Micro Processing Unit). The processor 301 reads computer programs stored in the main storage device 302, and executes the programs, thereby achieving various functions of the user terminal 102, the support apparatus 103, the management apparatus 104, the data flow processing apparatuses 105, and the data storage apparatuses 106.

The main storage device 302 is an apparatus that stores computer programs and data, and is, for example, a ROM (Read Only Memory), a RAM (Random Access Memory), and a nonvolatile semiconductor memory or the like.

The auxiliary storage device 303 is, for example, an apparatus for reading and writing recording media, such as a hard disk drive, an SSD (Solid State Drive), an optical storage medium (i.e., a CD (Compact Disc) a DVD (Digital Versatile Disc), etc.), a storage system, an IC card (Integrated Circuit Card) and an SD memory card, and a storage area of a cloud server. The computer programs and data stored in the auxiliary storage device 303 are read to the main storage device 302 as required.

The input device 304 is, for example, a keyboard, a mouse, a touch panel, a card reader, an audio input device, etc. The output device 305 is a user interface that provides various types of information, such as a processing progress and a processing result. The output device 305 is, for example, a screen display device (i.e., a liquid crystal monitor LCD (Liquid Crystal Display), a graphic card, etc.), an audio output device (i.e., a speaker etc.), a printer device, etc. Note that, for example, the information processing apparatus 300 may input and output information to and from another apparatus via the communication device 306.

The communication device 306 is a wired or wireless communication interface that achieves communication with the other apparatuses via communication means, such as a LAN and the Internet. The communication device 306 is, for example, a NIC (Network Interface Card), a wireless communication module, a USB (Universal Serial Bus) module, a serial communication module or the like.

Figure 4:
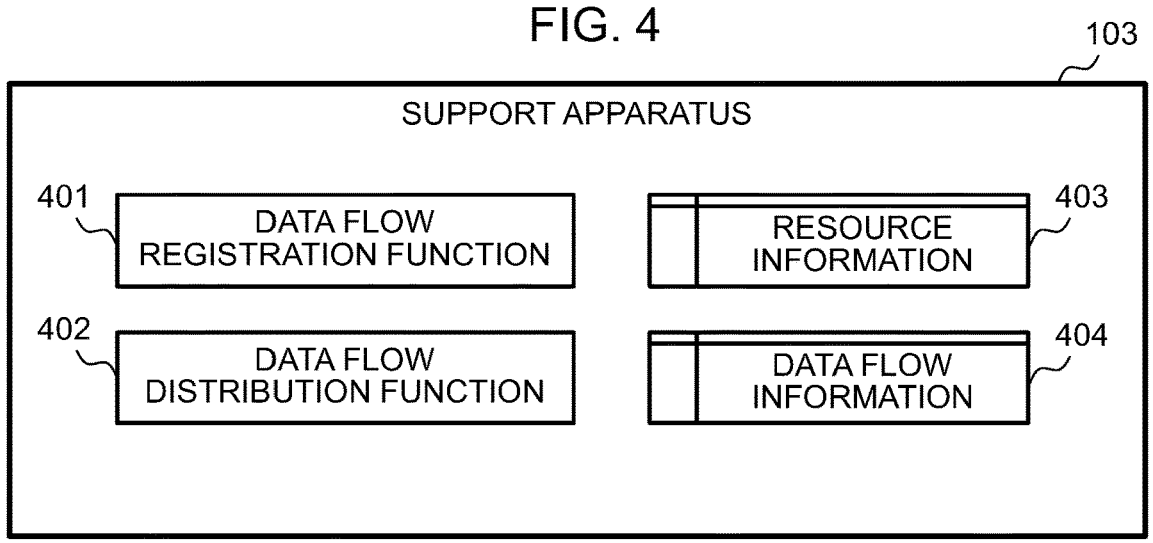
FIG. 4 is a configuration diagram showing a configuration example of functions of and data in a support apparatus according to Embodiment 1.

FIG. 4 is a configuration diagram showing a configuration example of functions of and data in the support apparatus according to Embodiment 1. In FIG. 4, the support apparatus 103 includes a data flow registration function 401 and a data flow distribution function 402, which are stored in the auxiliary storage device 303, and records resource information 403 and data flow information 404 in the auxiliary storage device 303. The resource information 403 is for recording information (e.g., an IP (Internet Protocol) address, position information, etc.) on each of the data flow processing apparatuses 105, which constitute the information processing system 101. Upon receipt of information on the data flow transmitted from the user terminal 102, the data flow registration function 401 registers the received information on the data flow in the data flow information 404. The data flow distribution function 402 distributes the entire or partial information registered in the resource information 403 and the data flow information 404, to each data flow processing apparatus 105.

Figure 5:
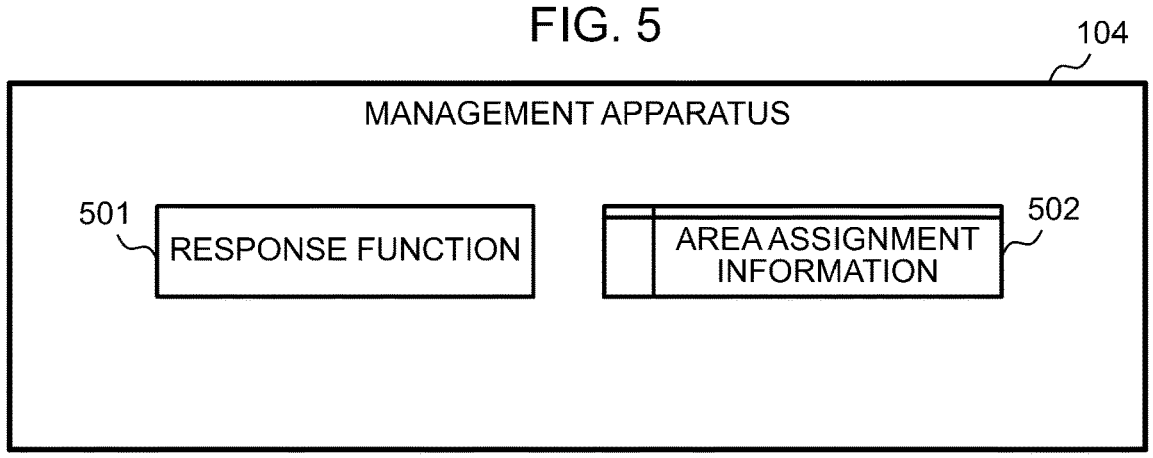
FIG. 5 is a configuration diagram showing a configuration example of functions of and data in a management apparatus according to Embodiment 1.

FIG. 5 is a configuration diagram showing a configuration example of functions of and data in the management apparatus according to Embodiment 1. In FIG. 5, the management apparatus 104 includes a response function 501 stored in the auxiliary storage device 303, and stores area assignment information 502 in the auxiliary storage device 303. Upon receipt of an assignee registration request including information on an area ID (Identification) issued by each data flow processing apparatus 105, the response function 501 verifies whether the area ID attached to the received assignee registration request is registered in the area assignment information (i.e., area assignment information for the management apparatus) 502 or not. When the received area ID is unregistered, this function records the area ID, and the IP address of the data flow processing apparatus 105 that is a transmission source of the assignee registration request, in the area assignment information 502, and returns a response indicating that registration is allowed to the data flow processing apparatus 105 that is the transmission source of the assignee registration request. When the received area ID is registered, the response function 501 returns a response indicating that registration is not allowed, to the data flow processing apparatus 105 that is the transmission source of the assignee registration request. Upon receipt of a request for area assignment information issued by each data flow processing apparatus 105, the response function 501 returns the area ID and the IP address of the data flow processing apparatus 105 serving as the assignee of the area ID, which are recorded in the area assignment information 502.

Figure 6:
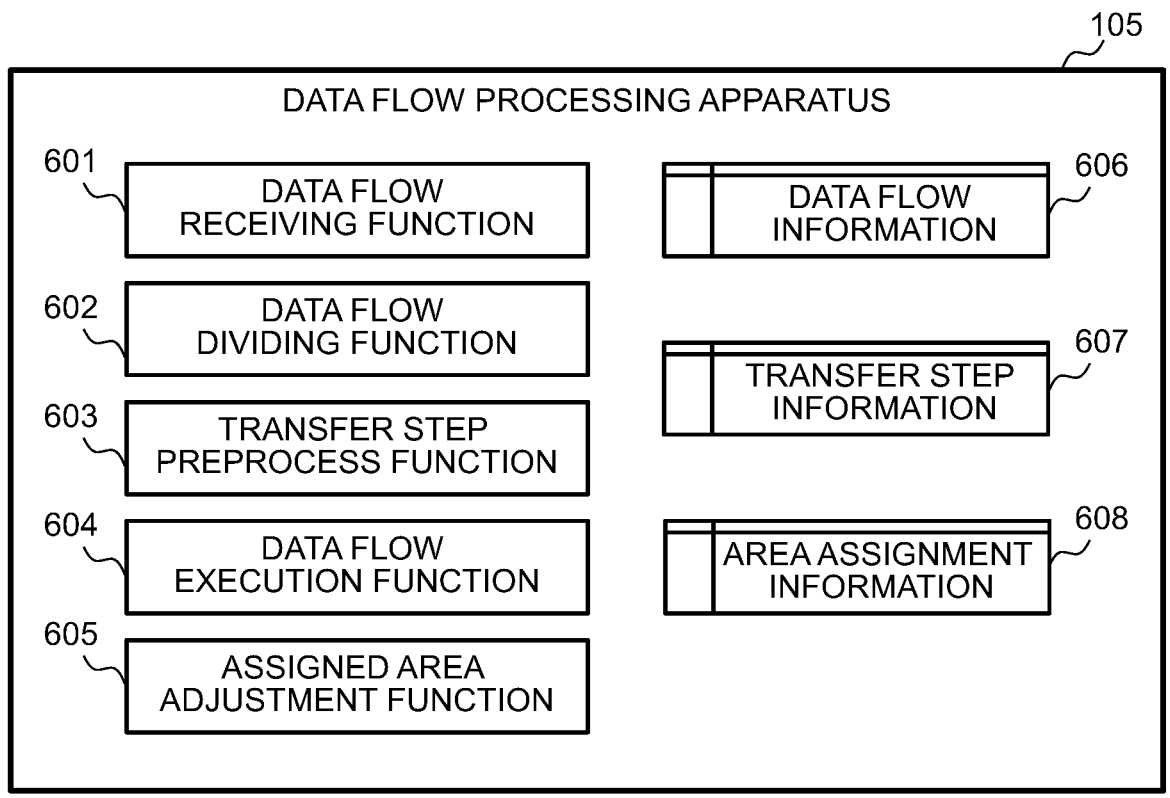
FIG. 6 is a configuration diagram showing a configuration example of functions of and data in a data flow processing apparatus according to Embodiment 1.

FIG. 6 is a configuration diagram showing a configuration example of functions of and data in a data flow processing apparatus according to Embodiment 1. In FIG. 6, the data flow processing apparatus 105 includes functions stored in the auxiliary storage device 303 that include a data flow receiving function 601, a data flow dividing function 602, a transfer step preprocess function 603, a data flow execution function 604 and an assigned area adjustment function 605, and stores data flow information 606, transfer step information 607 and area assignment information 608 in the auxiliary storage device 303. Upon receipt of information on the data flow transmitted from the support apparatus 103, the data flow receiving function 601 registers the received information on the data flow in the data flow information 606. The data flow dividing function 602 divides the information on the data flow (i.e., processing information) received by the data flow receiving function 601 into multiple pieces under a division condition that designates parallel processing among the data flow processing apparatuses 105. Here, for dividing the information on the data flow (i.e., processing information) into multiple pieces, for example, the data flow dividing function 602 is configured as a division function or a division part that divides the range where the processing information is recorded, into a plurality of areas, assigns each divided area an ID, and records them in the data flow information 606. The assigned area adjustment function 605 is configured as a determination function or a determination part that cooperates with the management apparatus 104, and determines the data flow processing apparatuses 105 respectively serving as assignees of the divided areas, and records the determined content in the area assignment information 608. The transfer step preprocess function 603 is a function of controlling communication between the data flow processing apparatuses, and for example, is configured as a communication function or a communication part that establishes communication connections, and records information on the established communication connections in the transfer step information 607, before data transmission between the data flow processing apparatuses serving as the assignees of the divided areas. The data flow execution function 604 is configured as an execution function or an execution part that executes the data flow in the assigned area.

Figure 7:
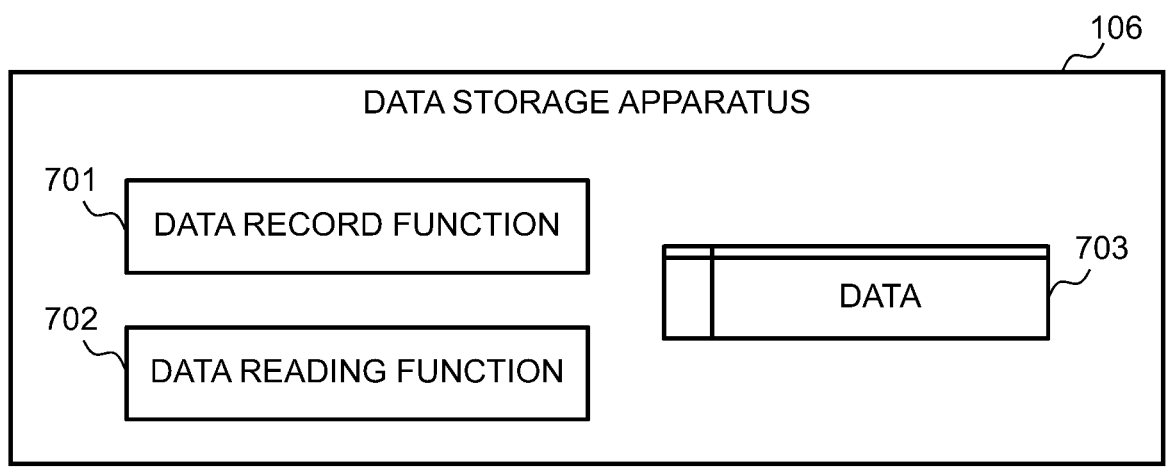
FIG. 7 is a configuration diagram showing a configuration example of functions of and data in a data storage apparatus according to Embodiment 1.

FIG. 7 is a configuration diagram showing a configuration example of functions of and data in the data storage apparatus according to Embodiment 1. In FIG. 7, the data storage apparatus 106 includes functions stored in the auxiliary storage device 303 that include a data record function 701 and a data reading function 702, and records various data items in data 703 that is a data storing part or a data storing area. Upon a request issued by each data flow processing apparatus 105, the data record function 701 and the data reading function 702 record and read data in and from the data 703. Note that upon receipt of a request for recording or reading data issued by an information processing apparatus, not shown, via the network 107 or a network, not shown, the data storage apparatus 106 executes a process therefor. The data storage apparatus 106 may be included in the information processing system 101, but is not necessarily included therein.

FIG. 8 is a configuration diagram showing a configuration example of area assignment information according to Embodiment 1. Data items recorded in the support apparatus 103, the management apparatus 104, and the data flow processing apparatuses 105 are recorded in a table format, for example. Here, as shown in FIG. 8, the area assignment information 502 stores records each including items that are an area ID 801, and a data flow processing apparatus IP address 802. The area ID 801 records an identifier (e.g., "Area-1") of the area assigned to each divided data flow. The data flow processing apparatus IP address 802 records the IP address (e.g., "aaa") of the data flow processing apparatus 105 assigned the process for the area stored in the area ID 801. Note that the area assignment information 608 has an identical or similar configuration.

FIG. 9 is a configuration diagram showing a configuration example of transfer step information according to Embodiment 1. In FIG. 9, the transfer step information 607 stores records each including items that are a transfer step ID 901, a transfer-source area ID 902, a transfer-source IP address 903, a transfer-destination area ID 904, a transfer-destination IP address 905, a transfer step type 906, a connection ID 907 to the coupling destination, and an intermediate data format 908. The transfer step ID 901 stores identification information (e.g., "TRANSFER 1") on the transfer step included in the data flow. The transfer-source area ID 902 records identification information (e.g., "Area-1") on the area in which the processes before the transfer step are recorded. The transfer-source IP address 903 records the IP address (e.g., "aaa") of the data flow processing apparatus 105 assigned the area stored in the transfer-source area ID 902. The transfer-destination area ID 904 records identification information (e.g., "Area-2") on the area in which the processes after the transfer step are recorded. The transfer-destination IP address 905 records the IP address (e.g., "bbb") of the data flow processing apparatus 105 assigned the area stored in the transfer-destination area ID 904. The transfer step type 906 records whether the role of the transfer step in the data flow for the area assigned to the data flow processing apparatus 105 that stores this transfer step information 607 is transmission or reception. The connection ID 907 to the coupling destination records identification information (e.g., "S01") on the communication connection established with the coupling-destination data flow processing apparatus 105. The intermediate data format 908 records the format of data to be transferred between the data flow processing apparatuses.

Figure 10:
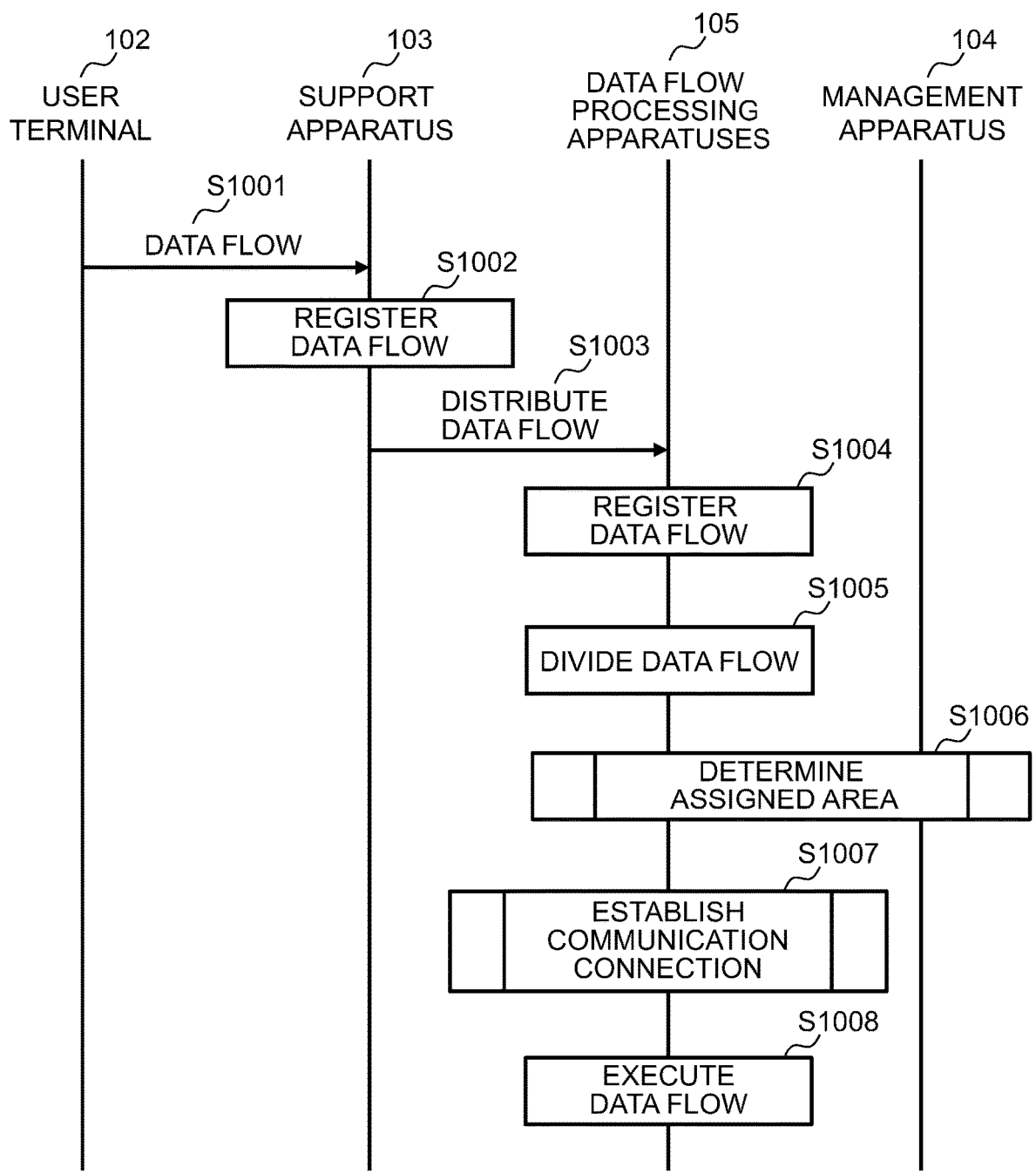
FIG. 10 is a sequence diagram showing an example of a distributed execution sequence for a data flow according to Embodiment 1.

FIG. 10 is a sequence diagram showing an example of a distributed execution sequence for a data flow according to Embodiment 1. In FIG. 10, when the user operates the user terminal 102 and creates a data flow, information on the data flow is transmitted from the user terminal 102 to the support apparatus 103 (S1001). The data flow registration function 401 of the support apparatus 103 registers the received information on the data flow in the data flow information 404 (S1002). The data flow distribution function 402 of the support apparatus 103 distributes the information on the data flow registered in the data flow information 404 to each data flow processing apparatus 105 in the information processing system 101 (S1003). Note that when the data flow registration function 401 has a portal site for designating registration and execution of the data flow, the user may access the portal site via the user terminal 102, register the data flow, and issue an instruction for execution of the data flow.

Each of the data flow processing apparatuses 105 disposed in a distributed manner in the distributed environment records the received information on the data flow in the data flow information 606 (S1004). Next, each data flow processing apparatus 105 divides the received information on the data flow into a plurality of areas (S1005), and cooperates with the management apparatus 104 and determines the data flow processing apparatuses 105 assigned the respective areas (S1006). Subsequently, the data flow processing apparatuses 105 assigned the respective areas establish a communication connection to the data flow processing apparatus 105 serving as the data transfer destination (S1007). Subsequently, the data flow processing apparatuses 105 assigned the respective areas execute the process for the data flows in the assigned areas (S1008).

Figure 11:
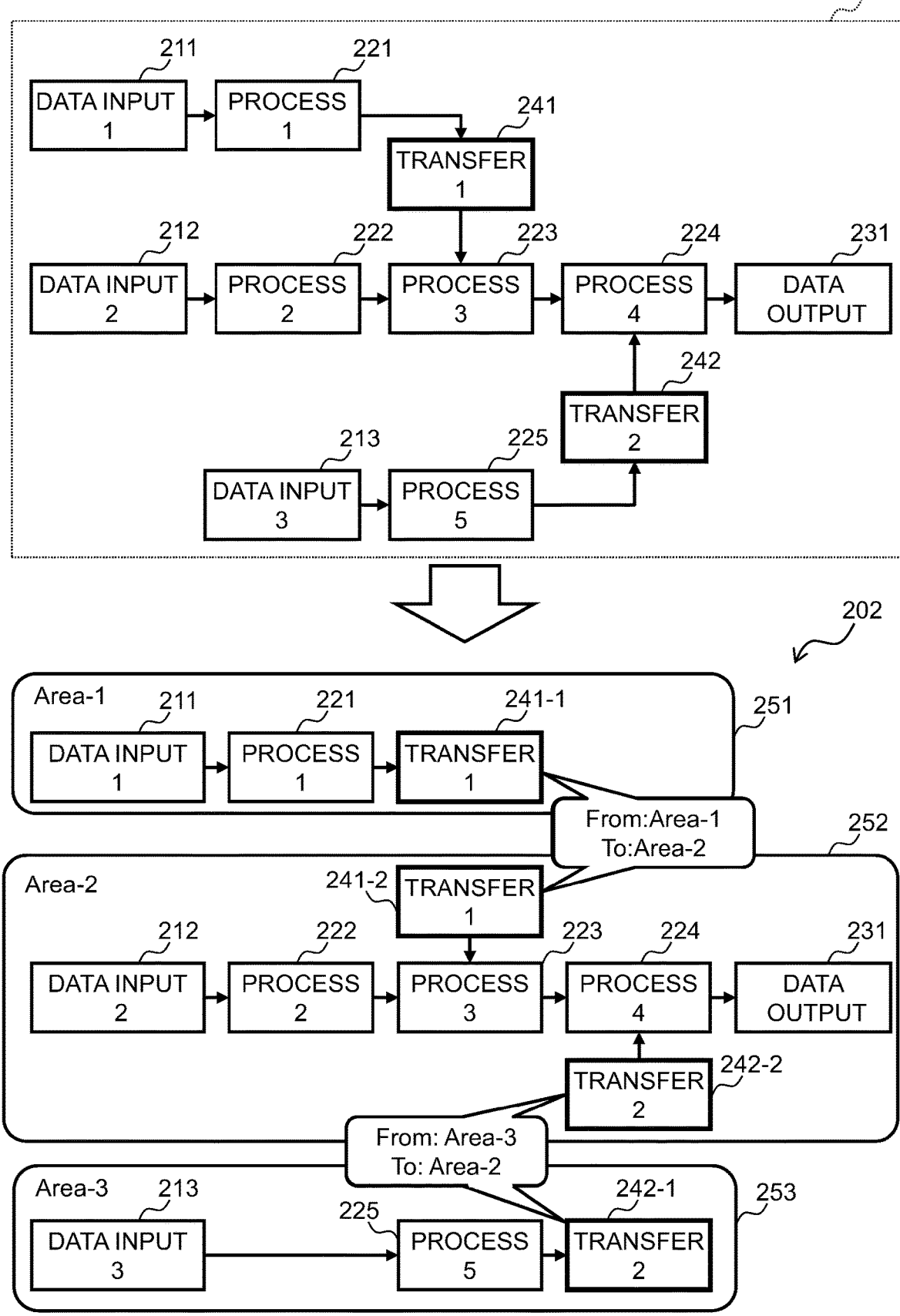
FIG. 11 is a configuration diagram showing a division example of the data flow according to Embodiment 1.

FIG. 11 is a configuration diagram showing a division example of the data flow according to Embodiment 1. In FIG. 11, the data flow 201 is configured as processing information that indicates data processing procedures from a plurality of start points to one end point in a manner identical or similar to that of the data flow 201 shown in FIG. 2.

Here, the data flow dividing function 602 of the data flow processing apparatus 105 divides the data flow 201 into three areas 251 to 253 on the basis of the first transfer step (i.e., "TRANSFER 1") 241 to the second transfer step (i.e., "TRANSFER 2") 242, and assigns the areas 251 to 253 the respective area IDs (e.g., "Area-1" to "Area-3") including sequential numbers. The data flow dividing function 602 divides the first transfer step (i.e., "TRANSFER 1") 241 that is the transfer part into first transfer steps (i.e., "TRANSFER 1") 241-1 and 241-2, divides the second transfer step (i.e., "TRANSFER 2") 242 that is the transfer part into second transfer steps 242-1 and 242-2, and manages the first transfer steps (i.e., "TRANSFER 1") 241-1 and 241-2 and the second transfer steps 242-1 and 242-2 as divided transfer parts.

Here, the data flow dividing function 602 couples the first process (i.e., "PROCESS 1") 221 to the first transfer step (i.e., "TRANSFER 1") 241-1, couples the first transfer step (i.e., "TRANSFER 1") 241-2 to the third process (i.e., "PROCESS 3") 223, couples the fourth process (i.e., "PROCESS 4") 224 to the second transfer step (i.e., "TRANSFER 2") 242-2, and couples the fifth process (i.e., "PROCESS 5") 225 to the second transfer step (i.e., "TRANSFER 2") 242-1.

The area 251 in the divided data flow 202 includes the first data input (i.e., "DATA INPUT 1") 211, the first process (i.e., "PROCESS 1") 221, and the first transfer step (i.e., "TRANSFER 1") 241-1. The area 252 includes the first transfer step 241-2, the second data input (i.e., "DATA INPUT 2") 212, the second process (i.e., "PROCESS 2") 222 to the fourth process (i.e., PROCESS 4"), 224, the data output 231, and the second transfer step (i.e., "TRANSFER 2") 242-2. The area 253 includes the third data input (i.e., "DATA INPUT 3") 213, the fifth process (i.e., "PROCESS 5") 225, and the second transfer step (i.e., "TRANSFER 2") 242-1. Thus, the information on the data flow 202 is correctly distributed to the areas 251 to 253.

The first transfer steps 241-1 and 242-2 is processes that transfer the processing result (hereinafter called intermediate data) of "PROCESS 1" before "TRANSFER 1" to "PROCESS 3" after "TRANSFER 1". The second transfer steps 242-1 and 242-2 are processes that transfer the intermediate data that is the processing result of "PROCESS 5" before "TRANSFER 2" to "PROCESS 4" after "TRANSFER 2". Accordingly, when a communication connection is established between the data flow processing apparatus 105 assigned the area 251 and the data flow processing apparatus 105 assigned the area 252, transfer of the intermediate data is executed as the processes of the first transfer steps 241-1 and 242-2 therebetween. When a communication connection is established between the data flow processing apparatus 105 assigned the area 252 and the data flow processing apparatus 105 assigned the area 253, transfer of the intermediate data is executed as the processes of the second transfer steps 242-1 and 242-2 therebetween.

Here, the first transfer step ("TRANSFER 1") 241-1 serves as a transfer step belonging to the area 251 (i.e., Area-1) that is the transfer source of the intermediate data, and the first transfer step ("TRANSFER 1") 241-2 serves as a transfer step belonging to the area 252 (i.e., Area-2) that is the transfer destination of the intermediate data. The first transfer steps ("TRANSFER 1") 241-1 and 241-2 are assigned "From: Area-1" as information on the areas indicating the transfer source of the intermediate data, and are assigned "To: Area-2" as information on the areas indicating the transfer destination of the intermediate data.

The second transfer step ("TRANSFER 2") 242-1 serves as the transfer step belonging to the area 253 (i.e., Area-3) that is the transfer source of the intermediate data, and the second transfer step ("TRANSFER 2") 242-2 serves as the transfer step belonging to the area 252 (i.e., Area-2) that is the transfer destination of the intermediate data. The second transfer steps ("TRANSFER 2") 242-1 and 242-2 are assigned "From: Area-3" as information on the areas indicating the transfer source of the intermediate data, and are assigned "To: Area-2" as information indicating the areas that are the transfer destination of the intermediate data. The relationship between the transfer-destination area ID and the transfer step is managed by the data flow dividing function 602.

The data flow dividing function 602 of each data flow processing apparatus 105 performs the data flow dividing process (step S1005 in FIG. 10) using the same dividing program. Accordingly, all the data flow processing apparatuses 105 obtain the same division result. Note that in this embodiment, the data flow dividing process (step S1005 in FIG. 10) is executed by each data flow processing apparatus 105. Alternatively, the support apparatus 103 may include the data flow dividing function 602, the data flow may be divided by the support apparatus 103, and the information on the divided data flow may be distributed to each data flow processing apparatus 105.

Here, for example, the support apparatus 103 that transmits and receives information between the user terminal 102 and each information processing apparatus 105 may include: a division function for the support apparatus that, upon receipt of the processing information from the user terminal 102, divides the range in which the received processing information is recorded and which is to be executed by the data flow processing apparatus 105, into a plurality of areas under a division condition that designates parallel processing among the data flow processing apparatuses 105; a determination function for the support apparatus that uniquely determines the assignee of the process for each area divided by the division function for the support apparatus, as any of the data flow processing apparatuses 105; and a notification function for the support apparatus that notifies (i.e., transmits) the determination of the assignee of the process, the information indicating the processing content for the corresponding area, and information on each data flow processing apparatus 105 assigned the corresponding area, to the corresponding data flow processing apparatus 105 determined by the division function for the support apparatus. Accordingly, the data flow apparatuses 105 can execute the processes for the respective areas on the basis of the notification from the support apparatus 103.

Figure 12:
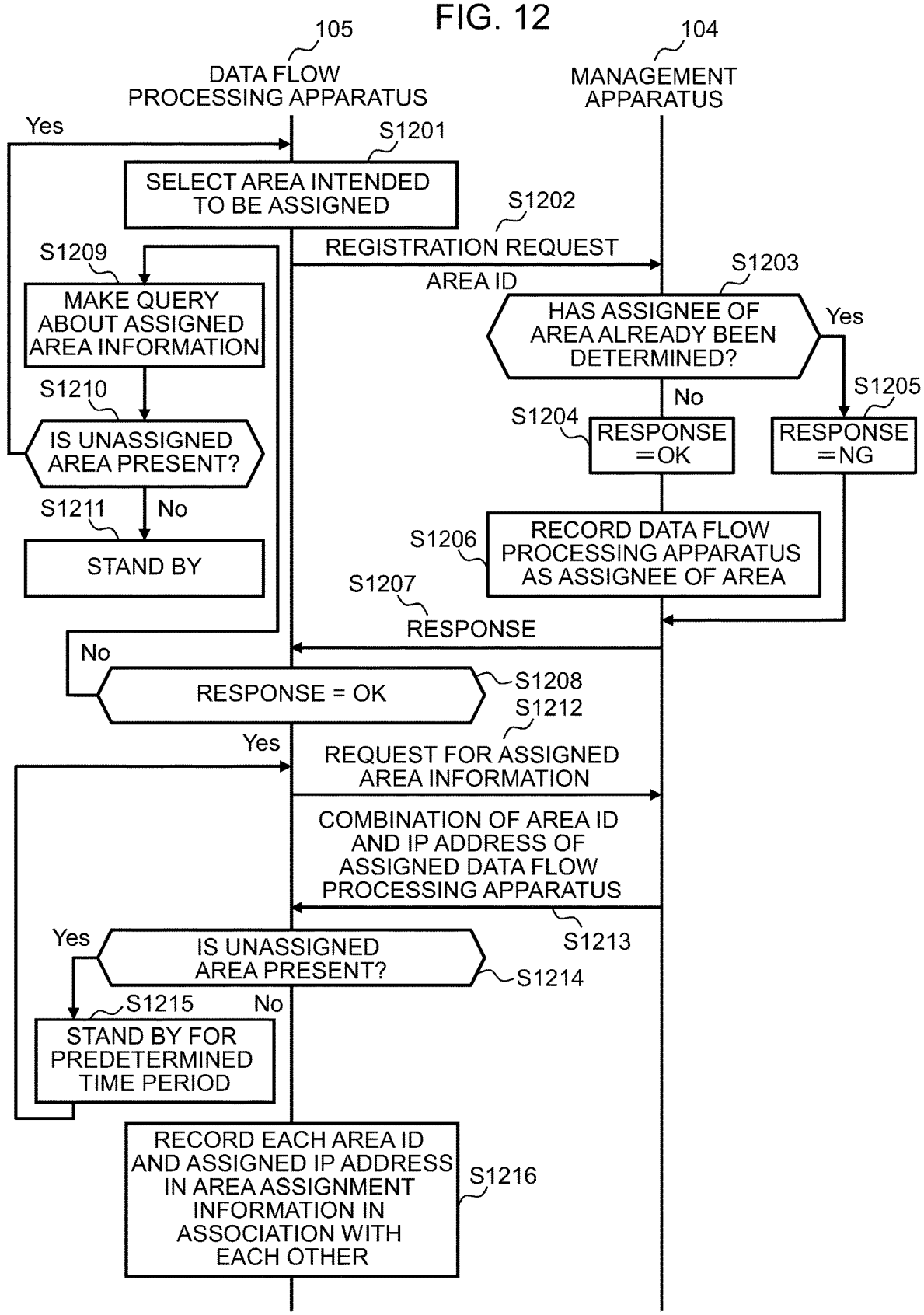
FIG. 12 is a sequence diagram showing an example of a sequence of an assigned area determination process according to Embodiment 1.

FIG. 12 is a sequence diagram showing an example of a sequence of an assigned area determination process according to Embodiment 1. In FIG. 12, the assigned area adjustment function 605 of the data flow processing apparatus 105 can use a leader selection algorithm when adjusting the assigned area. The assigned area adjustment function 605 selects, for example, one area from among the three areas 251 to 253, as an area intended to be assigned (S1201), and a registration request (i.e., an assignee registration request) including the area ID of the area intended to be assigned and the IP address of the request transmission source (i.e., the data flow processing apparatus 105) is transmitted to the management apparatus 104 (S1202).

The response function 501 of the management apparatus 104 having received the registration request refers to the area assignment information 502 on the basis of the received registration request, and verifies whether the area ID attached to the received registration request is registered in the area assignment information 502 or not (S1203). When the assignee of the received area ID is unregistered (No in S1203), this function sets the response to OK (S1204), and records the received area ID, the IP address of the data flow processing apparatus 105 serving as the request transmission source, in the area assignment information 502 (i.e., registration) (S1206). On the other hand, when the received ID is registered (Yes in S1203), the response function 501 sets the response to NG (S1205). Subsequently, the response function 501 transmits the information on the response, to the data flow processing apparatus 105 (S1207).

The assigned area adjustment function 605 having received the response determines whether the received response is OK or not (S1208). When the received response is OK (Yes in S1208), this function transmits a request for assigned area information request, to the management apparatus 104 (S1212). The response function 501 of the management apparatus 104 having received the request for the assigned area information transmits a combination of the area ID registered in the area assignment information 502, and the IP address of the data flow processing apparatus 105 assigned the corresponding area, to the data flow processing apparatus 105 (S1213).

Next, the assigned area adjustment function 605 of the data flow processing apparatus 105 determines presence or absence of the area with no assignee (S1214). When an unassigned area is present (Yes in S1214), this function waits for a predetermined time period (S1215), subsequently transmits the request for the assigned area information to the management apparatus 104 again (S1212). When an unassigned is absent (No in S1214), this function records each area ID, and the IP address of the data flow processing apparatus 105 assigned the corresponding area in association with each other, in the area assignment information 608 (S1216).

On the other hand, when the determination result in step S1208 is No, the assigned area adjustment function 605 queries the management apparatus 104 about the assigned area information (S1209), verifies presence or absence of an area with no assignee (S1210). When an unassigned area is present (Yes in S1210), this function selects one area intended to be assigned from among areas with no assignee, and repeats the processes in and after S1201. When an area with no assignee is absent (No in S1210) in S1210, the assigned area adjustment function 605 comes into a stand-by state (S1211). Note that identical or similar to steps S1212 and S1213, the assigned area adjustment function 605 transmits and receives information to and from the management apparatus 104 in step S1209.

According to this processing sequence, the data flow processing apparatuses 105 assigned the respective areas can be uniquely determined. Each data flow processing apparatus 105 can determine the area assigned to the own apparatus, and obtain the information on the combination of the corresponding area and the data flow processing apparatus 105 that is to execute the data flow in the corresponding area, from the area assignment information 608.

Note that in steps S1212 to step S1215, the number of executions of processes may be recorded, and when the number of executions exceeds a preset threshold, an error may be identified and subsequently the processes may be finished. One apparatus among the data flow processing apparatuses 105 is selected as the leader (for example, the data flow processing apparatus 105 having the smallest IP address is selected as the leader), the assigned area adjustment function 605 of the data flow processing apparatus 105 selected as the leader sequentially selects one data flow processing apparatus 105 from among the data flow processing apparatuses 105, sequentially allocates the selected one data flow processing apparatus 105 as the assignee of the corresponding area, records each area and the corresponding one data flow processing apparatus 105 in the area assignment information 608 in association with each other, and can thus distribute the recorded area assignment information 608 to each data flow processing apparatus 105. Accordingly, the assigned area adjustment function 605 selected as the leader can uniquely determine the data flow processing apparatuses 105 assigned the respective areas. Each data flow processing apparatus 105 can store the area assignment information 608 as information shared among the apparatuses.

Figure 13:
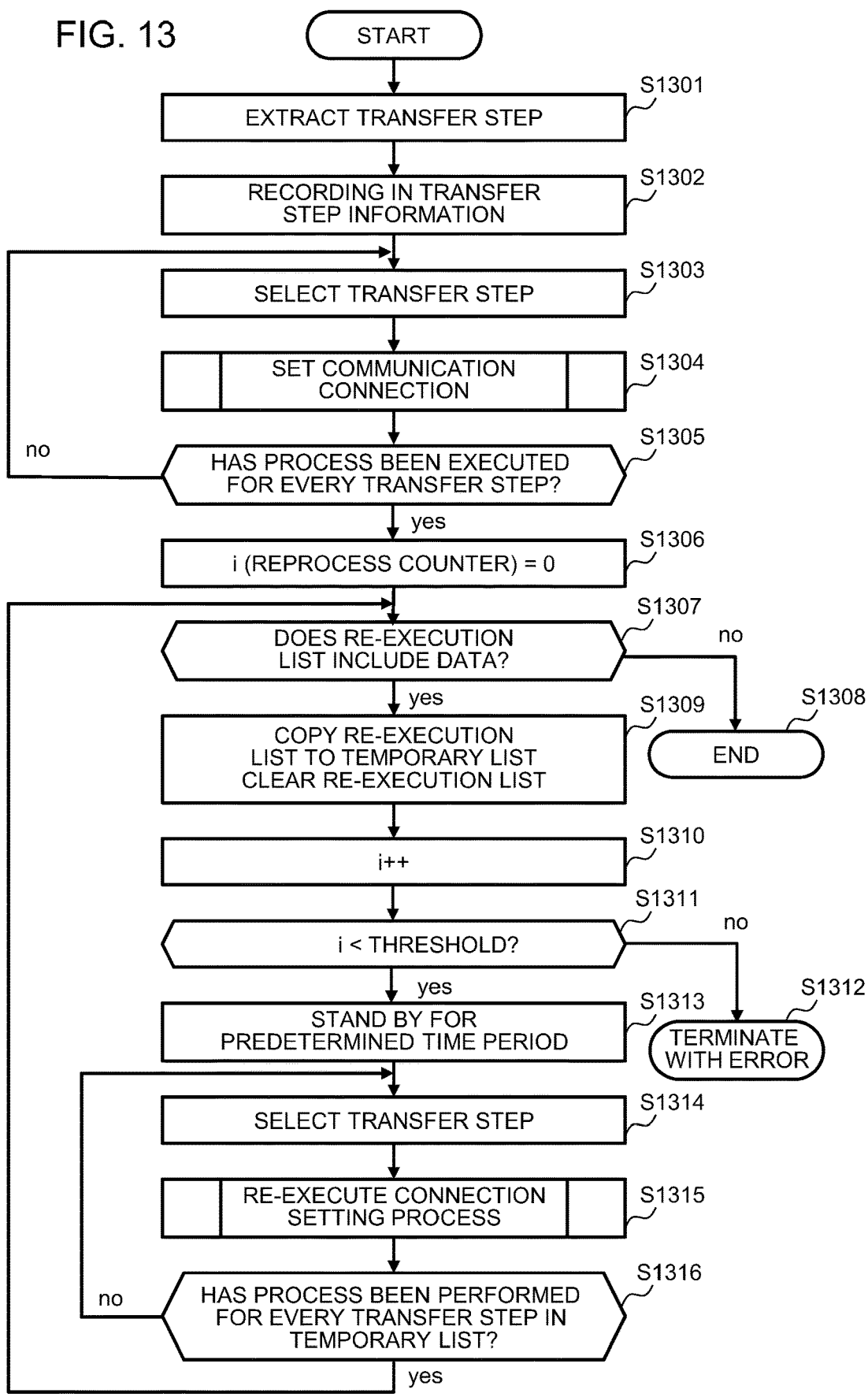
FIG. 13 is a flowchart showing an example of a communication connection establishment process according to Embodiment 1.

FIG. 13 is a flowchart showing an example of a communication connection establishment process according to Embodiment 1. Data transfer between the data flow processing apparatuses after division of the data flow can be performed via communication connections.

In FIG. 13, for example, the transfer step preprocess function 603 of the data flow processing apparatus 105 extracts all the transfer steps (i.e., transfer steps 241-1 to 242-2) from the areas of the data flow 202 shown in FIG. 11 assigned to the own apparatus (i.e., the transfer steps 241-1 to 242-2) (S1301), and stores the transfer step ID 901, the transfer-source area ID 902, the transfer-source IP address 903, the transfer-destination area ID 904, the transfer-destination IP address 905, and the transfer step type 906, in the transfer step information 607, with respect to all the extracted transfer steps 241-1 to 242-2 (S1302). In the data flow processing apparatus 105 assigned Area-1, the transfer step 241-1 is extracted and recorded. In the data flow processing apparatus 105 assigned Area-2, the transfer steps 241-2 and 242-2 are extracted and recorded. In the data flow processing apparatus 105 assigned Area-3, the transfer step 242-1 is extracted and recorded.

Here, when the transfer step preprocess function 603 extracts the transfer step 241-1, this function refers to the area assignment information 608 shown in FIG. 8, and with respect to the transfer step information 607 shown in FIG. 9, "TRANSFER 1" is recorded as information identifying the transfer step 241-1 in the transfer step ID 901 in the transfer step information 607 shown in FIG. 9, "Area-1" is recorded as a first division identifier (i.e., first communication information indicating the transfer-source area) uniquely identifying the area 251 to which the transfer step 241-1 in the transfer-source area ID 902, "aaa" is recorded as a first apparatus identifier (i.e., second communication information indicating the transfer-source data flow processing apparatus) uniquely identifying the data flow processing apparatus 105 assigned the process for the area 251 to which the transfer step 241-1 belongs, in the transfer-source IP address 903, "Area-2" is recorded as second division identifier (i.e., third communication information indicating the transfer-destination area) uniquely identifying the area 252 to which the transfer step 241-2 belongs, in the transfer-destination area ID 904, "bbb" is recorded as a second apparatus identifier (i.e., fourth communication information identifying the transfer-destination data flow processing apparatus) uniquely identifying the data flow processing apparatus 105 assigned the process for the area 252 to which the transfer step 241-2 belongs, in the transfer-destination IP address 905, and "TRANSMISSION" is recorded as the communication type between the data flow processing apparatus (i.e., fifth communication information identifying the communication type by transmission or reception, in the transfer step type 906. The transfer-source IP address 903 and the transfer-destination IP address 905 can be identified respectively from the transfer-source area ID 902 and the transfer-destination area ID 904, on the basis of the area assignment information 608.

Next, the transfer step preprocess function 603 selects the transfer step (e.g., "TRANSFER 1") identified by the transfer step ID 901 from the transfer step information 607 (S1303), and performs a communication connection setting process, described later, with respect to the selected transfer step (S1304). Subsequently, the transfer step preprocess function 603 repeats steps S1303 to S1305, thus executing the communication connection setting process (S1304) for all the transfer steps 241-1 to 242-2.

After the communication connection setting process is executed for all the transfer steps 241-1 to 242-2, the transfer step preprocess function 603 sets a reprocess execution counter i to zero (S1306), and verifies presence or absence of data registered in the re-execution list (S1307). The re-execution list is a list that records information on the transfer step whose communication connection setting has failed, is created during communication connection setting, described later, and records the ID of the transfer step. Here, when no data is in the re-execution list (No in S1307), the transfer step preprocess function 603 finishes the processing (S1308). When data is in the re-execution list (Yes in S1307), this function copies the re-execution list to a temporary list and subsequently removes the data in the re-execution list, thus clearing the re-execution list (S1309).

Subsequently, the transfer step preprocess function 603 increments the reprocess execution counter i by one (S1310), compares the value of the reprocess execution counter i with the preset threshold (S1311). When i<threshold is satisfied (Yes in S1311), this function stands by for a predetermined time period (S1313) and then selects one transfer step from the temporary list (S1314), and re-executes the communication connection setting process for the selected transfer step (S1315). Here, the transfer step preprocess function 603 determines whether or not the communication connection setting process has been executed for all the transfer steps in the temporary list (S1316). When not all the steps have been executed (No in S1316), this function repeats the processes in steps S1314 to S1316, and when all the steps have been executed (Yes in S1316), this function returns the processing to step S1307, and verifies presence or absence of data in the re-execution list.

In step S1311, when the value of the reprocess execution counter i does not satisfy the condition i<threshold, the transfer step preprocess function 603 identifies an error, and terminates the processes in this routine (S1312).

Figure 14:
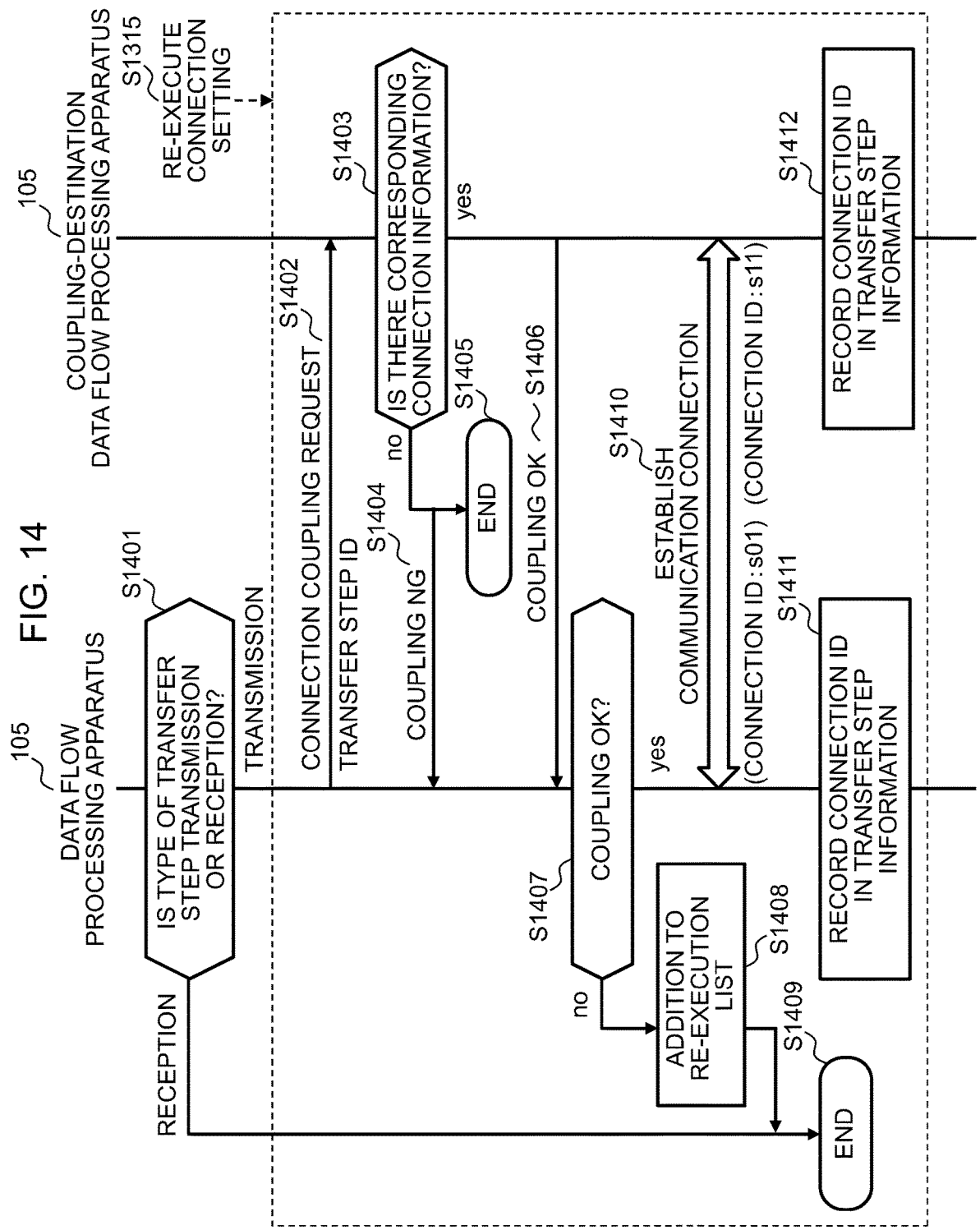
FIG. 14 is a sequence diagram showing an example of a communication connection setting sequence according to Embodiment 1.

FIG. 14 is a sequence diagram showing an example of a communication connection setting sequence according to Embodiment 1. The communication connection setting sequence is an example of specific content of the communication connection setting process in FIG. 13 (S1304). The communication connection setting process (S1304) is executed for every transfer step. In FIG. 14, the transfer step preprocess function 603 verifies whether the transfer step type is transmission or reception (S1401). When the transfer type is reception, this function finishes the process (S1409). When the transfer step type is transmission, this function transmits a connection coupling request that includes the transfer step ID and the IP address of the transmission-source data flow processing apparatus, to the data flow processing apparatus 105 serving as the coupling destination (i.e., transfer destination) (S1402).

When the coupling-destination data flow processing apparatus 105 receives the connection coupling request, the transfer step preprocess function 603 refers to the transfer step information 607 on the basis of the transfer step ID, and the IP address of the data flow processing apparatus 105 that is the transmission source of the connection coupling request, and verifies whether the connection information (the transfer step ID, the transfer-source IP address, and the transfer step type) is present or not as information corresponding to the transfer step information 607 (S1403). The corresponding information is information where the transfer step ID 901 and the transfer-source IP address 903 respectively match the received transfer step ID and transfer-source IP address, and the transfer step type is reception. When the transfer step information 607 does not include the corresponding information, the coupling-destination transfer step preprocess function 603 returns information indicating coupling NG to the transfer-source data flow processing apparatus 105 (S1404). Subsequently, this function finishes the processes in this routine (S1405). When the transfer step information 607 includes the corresponding information, this function transmits information indicating coupling OK to the transfer-source data flow processing apparatus 105 (S1406).

Upon receipt of the information indicating coupling OK from the coupling-destination data flow processing apparatus 105 (Yes in S1407), the transfer step preprocess function 603 of the communication connection transmission source establishes a communication connection with the coupling-destination data flow processing apparatus 105 (S1410), and records the connection ID 907 to the coupling destination in the transfer step information 607 (S1411). Recording of the connection ID 907 to the coupling destination of the transfer step information 607 is executed also by the coupling-destination data flow processing apparatus 105 (S1412). When coupling is NG (No in S1407), the transfer step preprocess function 603 of the connection coupling request transmission source adds the transfer step ID to the re-execution list (S1408), and subsequently the processes in this routine are finished (S1409).

In step S1408, for the transfer step added to the re-execution list, the communication connection setting process is re-executed through the processes in steps S1307 to S1316 shown in FIG. 13. The re-execution of the communication connection setting process (S1315 in FIG. 13) is processes in and after step S1402 in FIG. 14.

According to the processes in steps S1004 to S1007 in FIG. 10, information on the data flow processing apparatuses 105 required for data flow parallel processing and merger is shared among the data flow processing apparatuses 105, and the communication connections required to transfer the intermediate data are established. After these processes are executed, i.e., after the communication connections between the data flow processing apparatuses 105 are established, the data flow processing apparatuses 105 execute the processes for the data flow for the assigned areas (step S1008 in FIG. 10).

Figure 15:
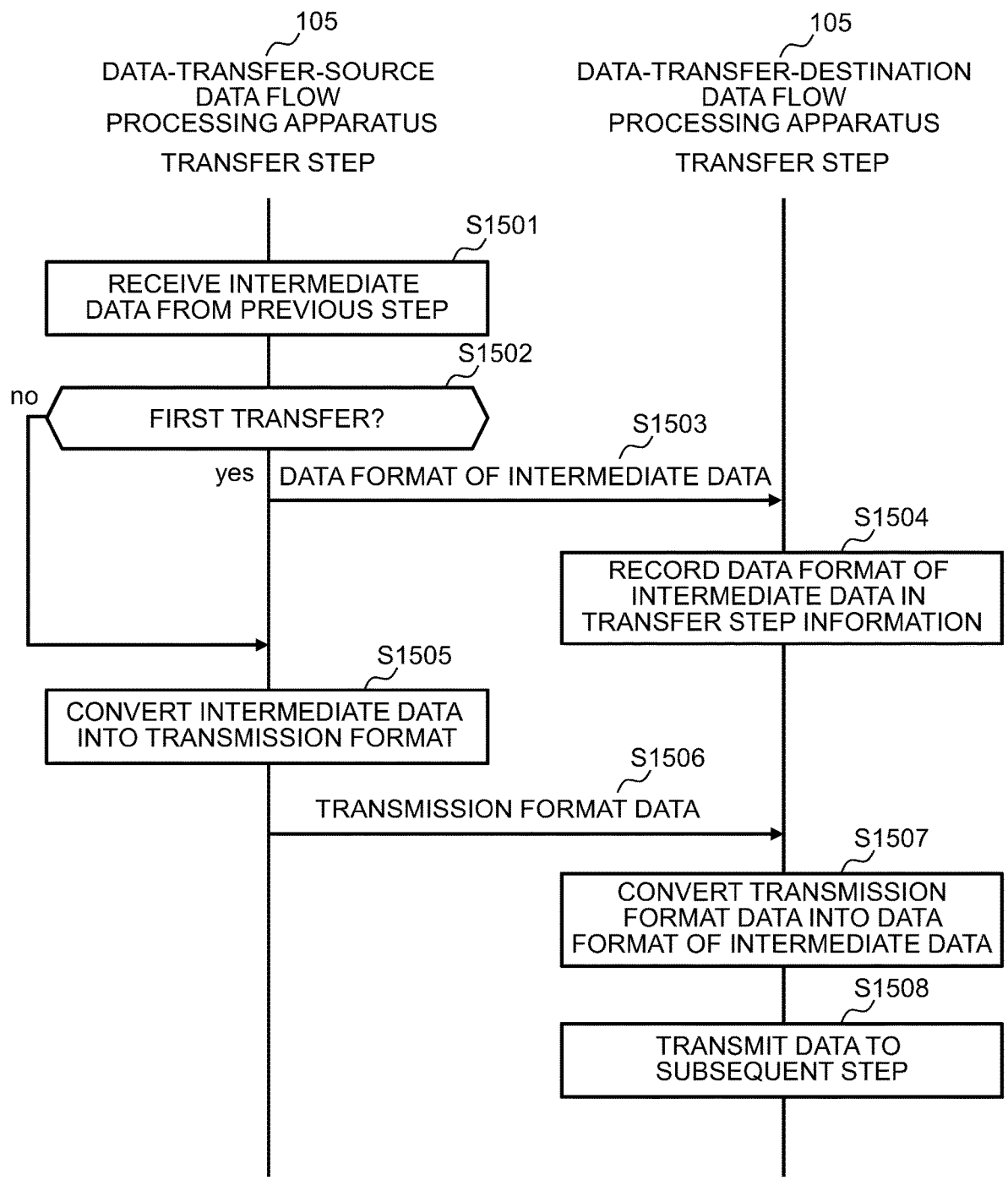
FIG. 15 is a sequence diagram showing an example of an intermediate data transfer sequence between data flow processing apparatuses according to Embodiment 1.

FIG. 15 is a sequence diagram showing an example of an intermediate data transfer sequence between data flow processing apparatuses according to Embodiment 1. The transfer of the intermediate data is executed in the transfer step when the data flow execution function 604 of the data flow processing apparatus 105 executes the data flow.

The transfer of the intermediate data requires that the data flow processing apparatus 105 serving as the transfer destination of the intermediate data understands the format of the intermediate data. Accordingly, before the first transfer of the intermediate data, the data flow processing apparatus 105 that is the transfer source of the intermediate data notifies the transfer-destination data flow processing apparatus 105 of the format of the intermediate data.

In FIG. 15, for example, in the transfer step 241-1, the data flow execution function 604 of the data-transfer-source data flow processing apparatus 105 receives the intermediate data from the previous process (S1501), determines whether the transfer is the first one or not (S1502). When the transfer is the first one (Yes in S1502), this function transmits the information indicating the data format of the intermediate data to the data-transfer-destination data flow processing apparatus 105 (S1503). The data flow execution function 604 of the data-transfer-destination data flow processing apparatus 105 records the information indicating the data format of the intermediate data, in the transfer step information 607 (S1504).

The data-transfer-source data flow processing apparatus 105 converts (for example, serializes) the intermediate data into the transmission format (S1505), and transmits the converted data in the transmission format to the data-transfer-destination data flow processing apparatus 105 (S1506). Upon receipt of the data in the transmission format data, the data-transfer-destination data flow processing apparatus 105 converts the received transmission format data into the data format of the intermediate data (S1507), and transmits the converted intermediate data to the subsequent process (S1508).

Note that the transmission of the information indicating the data format of the intermediate data, and the transmission of the intermediate data are performed using each communication connection established by the communication connection establishment process with respect to each transfer step. The processes other than the transfer step of transferring data are the same as execution of the data flow performed in one data flow processing apparatus 105.

In case an error occurs in any of the processes that are the division of the data flow (step S1005 in FIG. 10), the assigned area determination (step S1006 in FIG. 10), and the communication connection establishment (step S1007 in FIG. 10), the function assigned each process may notify the support apparatus 103 of the error, and the support apparatus 103 may notify the user terminal 102 of the error.

In this embodiment, when the data flow processing apparatuses 105 are each assigned processes of the data input parts (i.e., "DATA INPUT 1" 211 to "DATA INPUT 3" 213) and the processing parts (i.e., "PROCESS 1" 221 to "PROCESS 5" 225) as processes for the corresponding areas, the data flow execution function 604 receives data from the start point, and executes the process for the received data (e.g., statistical processing and anonymization process). When the data flow processing apparatuses 105 are each assigned the divided transfer parts (i.e., "TRANSFER 1" 241-1 and 241-2, and "TRANSFER 2" 242-1 and 242-2) as processes for the corresponding areas, this function executes data transfer between the information processing apparatuses. Accordingly, the processes for the areas can be securely executed by the corresponding data flow processing apparatuses 105.

In this embodiment, before the first transfer of the intermediate data, the notification about the data format (i.e., transfer of the information on the data format) is performed. The notification about the data format is not limited to be performed at this timing, may be performed when the communication connection is established. In a case where the formats of the intermediate data are different with respect to the intermediate data items, the intermediate data format may be notified every time before transfer of the intermediate data. When the intermediate data is transferred, the data format is not necessarily previously notified. For example, by adopting the JSON format, the transfer-destination data flow processing apparatus 105 can understand the data type even without preliminary notification about the data format.

In this embodiment, the communication connection for transferring the intermediate data is established. The communication connection is not necessarily established. The intermediate data may be transferred by connection less communication.

For example, when the data includes a plurality of records, the intermediate data may be transferred on a record-by-record basis or for every certain number of records, or may be collectively transferred at one time. For example, the intermediate data transfer method may be designated when the data flow is created, or a default method may be designated. Transfer steps included in the same data flow may be subjected to different transfer methods.

In this embodiment, the example where one data flow processing apparatus 105 is assigned one area is described. Alternatively, one data flow processing apparatus 105 may be assigned a plurality of areas. In this case, the data flow processing apparatus 105 may individually execute the data flow in each area, or may integrate data flows in assigned areas into a single data flow and execute the integrated data flow.

In this embodiment, as shown in FIG. 12, each data flow processing apparatus 105 determines the area to be assigned, in an autonomous and distributed manner. For example, the support apparatus 103 divides the data flow, and determine the data flow processing apparatuses 105 to be respectively assigned the divided areas. Here, for example, the support apparatus 103 may randomly allocate the areas to the data flow processing apparatuses 105. In a case where the data flow processing apparatuses 105 are installed at places apart from each other, each data flow processing apparatus 105 or the support apparatus 103 may create a plurality of combinations of the transmission-source data flow processing apparatuses 105 and the transmission-destination data flow processing apparatuses 105, for each transfer step, and allocate the data flow processing apparatuses 105 assigned the corresponding areas so that the network distance between the transmission-source data flow processing apparatus 105 and the transmission-destination data flow processing apparatus 105 can be short. In a case where two or more transfer steps reside, the total of the network distances may be considered, the data flow processing apparatuses 105 to be assigned the corresponding areas may be allocated so as to reduce the distance.

For example, the assigned area adjustment function 605 of each data flow processing apparatus 105 creates a predetermined number of combinations of the data flow processing apparatuses 105 including data flow processing apparatuses 105 as many as the number of areas. For each created combination, the data flow processing apparatuses 105 included in each combination may uniquely allocate the data flow processing apparatuses 105 to the respective areas for the data flow, store distance information indicating the total of the distances between the data flow processing apparatuses 105 in association with the corresponding combination, identify a combination having the minimized total of the distances between the data flow processing apparatuses 105 on the basis of the stored distance information, and determine the data flow processing apparatuses 105 included in the identified combination as assignees of the process for the area 251 or 253 including the transfer-source transfer step (i.e., divided transfer part) 241-1 or 242-1 among the areas, or assignees of the process for the area 252 including the transfer-destination transfer steps (i.e., divided transfer parts) 241-2 and 242-2. Accordingly, data transfer can be performed between the data flow processing apparatuses that minimize the total of distances, which can minimize the time period required for the data transfer. For example, through machine learning, to minimize the total of the distances of the data flow processing apparatuses 105, the optimal combination of the data flow processing apparatuses 105 can be selected.

In this embodiment, the table representation is used as an example of indicating each data item. However, the method of recording each data item is not limited to the table type. Data may be recorded by any of various method, such as a list or a chain. The recorded elements may be represented in any of various formats, such as numerals, symbols or mathematical expression, for example.

The support apparatus 103, the management apparatus 104, the data flow processing apparatuses 105, and the data storage apparatuses 106 may be virtual machines or containers. For example, the support apparatus 103 may include a function of activating a virtual machine or a container. At an opportunity when the data flow registration request is received from the user terminal 102, the virtual machine or the container may be activated as the data flow processing apparatus 105. For example, the data flow processing apparatus 105 may include: an execution container assigned processes for the data input parts (i.e., "DATA INPUT 1" 211 to "DATA INPUT 3" 213) and for the processing parts (i.e., "PROCESS 1" 221 to "PROCESS 5" 225), as the processes of the data flow execution function 604; and a transfer container assigned processes for divided transfer parts (i.e., "TRANSFER 1" 241-1 and 241-2 and "TRANSFER 2" 242-1 and 242-2). Accordingly, part of the data flow processing apparatus 105 can be virtualized.

According to this embodiment configured as described above, in a distributed environment, parallelization of data processing from multiple start points to one or more end points, and a merger of data items after parallel processing can be achieved, which can resultantly improve the data processing speed.

Parallelization of data flow processing can be easily achieved on the basis of the information on the transfer step inserted by the operation of the user without the user's explicitly designating the data flow processing apparatus 105 that executes the data flow of the corresponding area.

Embodiment 2

In this embodiment, an example of execution between two or more locations, such as of countries, regions, multiple companies, or multiple departments in the same company is described. In a case of dealing with data items administered by different parties, transfer of the data items between locations requires compliance with laws and ordinances, security policies of companies, etc.

Figure 16:
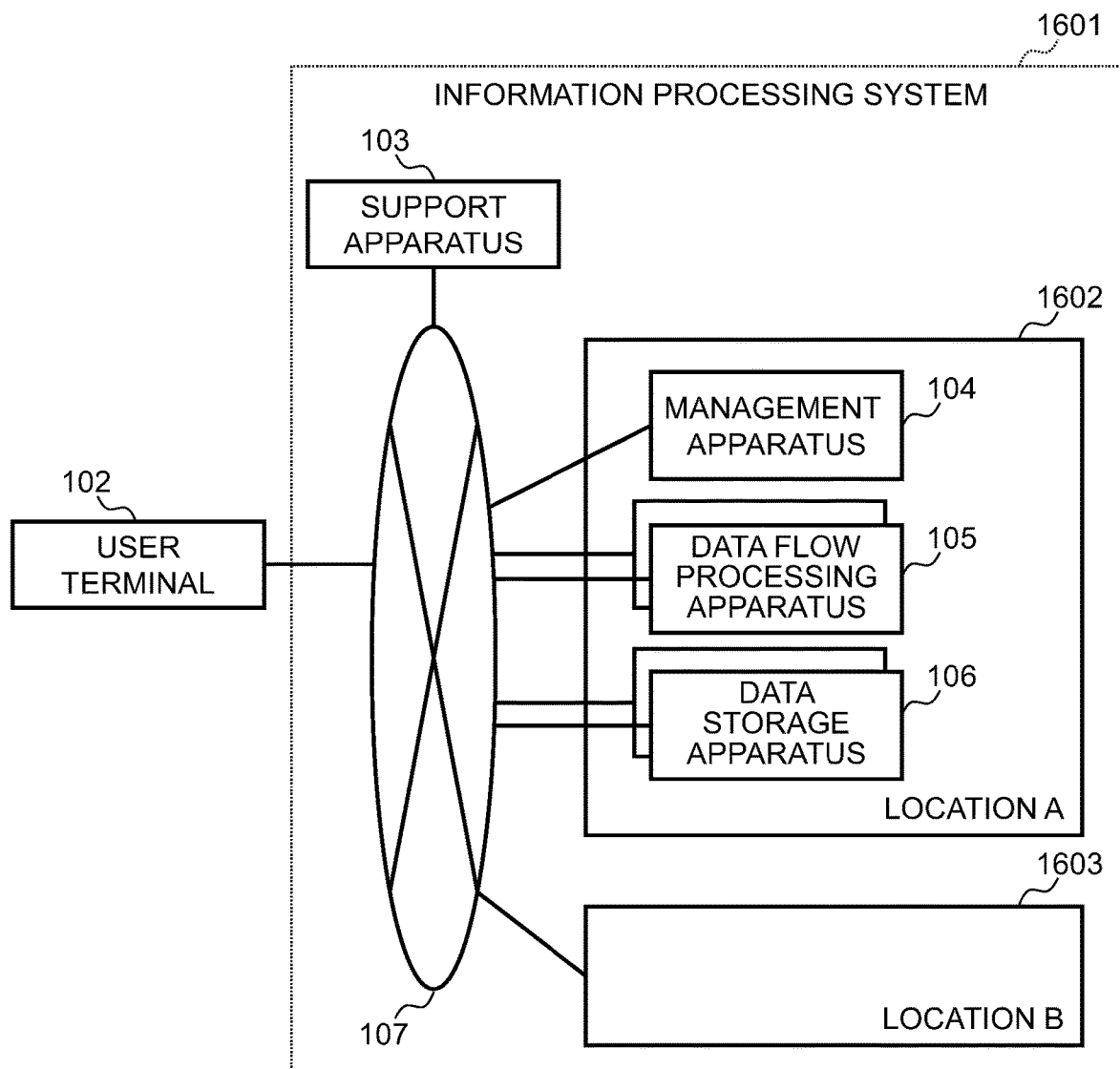
FIG. 16 is a configuration diagram showing an example of a configuration of an information processing system according to Embodiment 2.

FIG. 16 is a configuration diagram showing an example of a configuration of an information processing system according to Embodiment 2. In FIG. 16, the information processing system 1601 includes a support apparatus 103, two or more locations 1602 and 1603. The locations 1602 and 1603 each include a management apparatus 104, a plurality of data flow processing apparatuses 105, and a plurality of data storage apparatuses 106. The user terminal 102, the support apparatus 103, and the locations 1602 and 1603 are coupled to each other via a network 107. Here, the location 1602 is managed as what has a location name "LOCATION A", and the location 1603 is managed as what has a location name "LOCATION B". Note that in this embodiment and embodiments thereafter, the apparatuses 102 to 106 each include functions identical or similar to those in Embodiment 1. Hereinafter, points different from those in Embodiment 1 are mainly described accordingly.

FIG. 17 is a configuration diagram showing a division example of the data flow according to Embodiment 2. In FIG. 17, a data flow 1701 is information generated by the user terminal 102 on the basis of the operation of the user, and includes: a first data input (i.e., "DATA INPUT 1") 211, a second data input (i.e., "DATA INPUT 2") 212 and a third data input (i.e., "DATA INPUT 3") 213, as start points for data input; a first process (i.e., "PROCESS 1") 221 to a fifth process (i.e., "PROCESS 5") 225, as processes for executing data statistical processing, data anonymization process and the like; a first transfer step (i.e., "TRANSFER 1") 261 and a second transfer step (i.e., "TRANSFER 2") 262 as transfer steps serving as switching points of the data flow processing apparatuses 105; and a data output 231 as an end point for data output.

Here, similar to Embodiment 1, the user inserts the transfer step into the switching points of the data flow processing apparatuses 105 for executing parallel processing, and inserts the transfer step into the switching point of the locations 1602 and 1603. Furthermore, in each transfer step, an execution location before the transfer step, and an execution location after the transfer step are designated. For example, the user inserts the first transfer step (i.e., "TRANSFER 1") 261, as the transfer step, into the switching point of the data flow processing apparatuses 105. The first transfer step (i.e., "TRANSFER 1") 261 is assigned "From: LOCATION A" and "To: LOCATION A" as information (execution location identifier) indicating that the processes before and after the transfer step are executed at the location A. The user inserts the second transfer step (i.e., "TRANSFER 2") 262, as the transfer step, into the switching point of the locations 1602 and 1603. The second transfer step (i.e., "TRANSFER 2") 262 is assigned "From: LOCATION B" and "To: LOCATION A" as information (execution location identifier) indicating that the processes before the transfer step are executed at the location B and the processes after the transfer step are executed at the location A. The instruction for the execution location is displayed as a configurable property, by the user's double-clicking the transfer step 261 or 262 when they design the data flow using a GUI, for example.

The data flow dividing function 602 having received the information on the data flow 1701 divides the data flow 1701 into three areas 271 to 273 on the basis of the first transfer step (i.e., "TRANSFER 1") 261 and the second transfer step (i.e., "TRANSFER 2") 262, and assigns the areas 271 to 273 the respective area IDs (e.g., "A1", "A2" and "B1") including sequential numbers. The data flow dividing function 602 divides the first transfer step (i.e., "TRANSFER 1") 261 that is the transfer part into first transfer steps (i.e., "TRANSFER 1") 261-1 and 261-2, and divides the second transfer step (i.e., "TRANSFER 2") 262 that is the transfer part into second transfer steps 262-1 and 262-2. In this case, the divided area 271 of the data flow 1702 includes the first data input (i.e., "DATA INPUT 1") 211, the first process (i.e., "PROCESS 1") 221, and the first transfer step (i.e., "TRANSFER 1") 261-1. The area 272 includes the first transfer step (i.e., "TRANSFER 1") 261-2, the second process (i.e., "PROCESS 2") 221 to the fourth process (i.e., "PROCESS 4") 224, the data output 231, and the second transfer step (i.e., "TRANSFER 2") 262-2. The area 273 includes the third data input (i.e., "DATA INPUT 3") 213, the fifth process (i.e., "PROCESS 5") 225, and the second transfer step (i.e., "TRANSFER 2") 262-1.

The data flow dividing function 602 assigns the divided areas 271 to 273 area IDs. Here, the data flow dividing function 602 converts information on the process execution places designated by the transfer steps 261 and 262 from the location names into area IDs. The area ID includes the location name, and the sequential number at the location. For example, the first transfer steps ("TRANSFER 1") 261-1 and 261-2 are assigned "From: A1" as information on the areas indicating the transfer source of the intermediate data, and are assigned "To: A2" as information on the areas indicating the transfer destination of the intermediate data. The second transfer steps ("TRANSFER 1") 261-1 and 261-2 are assigned "From: B1" as information on the areas indicating the transfer destination of the intermediate data, and are assigned "To: A2" as information on the areas indicating the transfer destination of the intermediate data.

Each data flow processing apparatus 105 holds the name of the location to which this apparatus belongs, as an environment variable, for example. The assigned area determination sequence is identical or similar to that in Embodiment 1. Note that the assigned area adjustment function 605 selects one area where execution is designated at the location to which this function belongs (i.e., in this embodiment, the area whose area ID includes the own location name), when selecting the area intended to be assigned. The management apparatus 104 periodically transmits the area assignment information 608 at the location to which this apparatus belongs, to the management apparatus 104 at another location, thereby sharing the information. Furthermore, in response to the request for the assigned area information issued by the data flow processing apparatus 105 (i.e., step S1212 in FIG. 12), the management apparatus 104 transmits the area assignment information 608 at the location to which this apparatus belongs and the area assignment information 502 obtained from the other management apparatus 104, to the data flow processing apparatuses 105 (i.e., step S1213 in FIG. 12).

As described above, each data flow processing apparatus 105 can obtain the information on the data flow processing apparatuses 105 assigned the corresponding areas also with respect to the areas for the data flow to be executed at two or more different locations 1602 and 1603, thereby allowing the data flow to be executed across the locations. Here, in the case where the data flow processing apparatuses 105 are disposed at the different locations 1602 and 1603, and the transfer steps 261 and 262 of the data flow 1701 are assigned the execution location identifier (e.g., From: LOCATION A) for uniquely identifying the execution location of the data flow processing apparatus 105, the data flow dividing function 602 of each data flow processing apparatus 105 converts the execution location identifier into the division identifier (e.g., area ID=A1) for uniquely identifying each area, and assigns the converted division identifier to each area. The assigned area adjustment function 605 of each data flow processing apparatus 105 uniquely determine the data flow processing apparatus 105 serving as the assignee of the process for each area on the basis of the division identifier assigned the corresponding area.

In this embodiment, in the case where the data flow processing apparatuses 105 are disposed at the different locations 1602 and 1603, the data flow can be executed across the locations. According to this embodiment, the execution location for each process of the data flow can be designated. An anonymization process is executed for each input data item on one data flow can be executed. Each input data item can be converted into transferrable data, for example, into data where untransferable items are removed. The converted data items can be aggregated and processed. Even when the resources at each location are not known, data flow parallel processing can be designated, and high-speed processing of the data flow can be easily achieved. The user inserts the transfer step and designates the location, thereby allowing high-speed processing of the data flow to be achieved.

Note that the management apparatus 104 does not necessarily reside at each of the location 1602 and 1603. A single apparatus may reside in the information processing system 1601. Alternatively, the apparatuses may reside at one or some of the locations (e.g., the location 1602). The different locations 1602 and 1603 may be geographically different locations, or logically different locations, for example, locations that indicate departments in a company even if they are geographically identical. In this embodiment, the example of the two locations is described. Alternatively, the number of locations may be more than two.

Embodiment 3

In this embodiment, a method of indicating execution locations for the processes, and a method of adjusting assigned areas in a case where the locations have a tiered structure are described.

Figure 18:
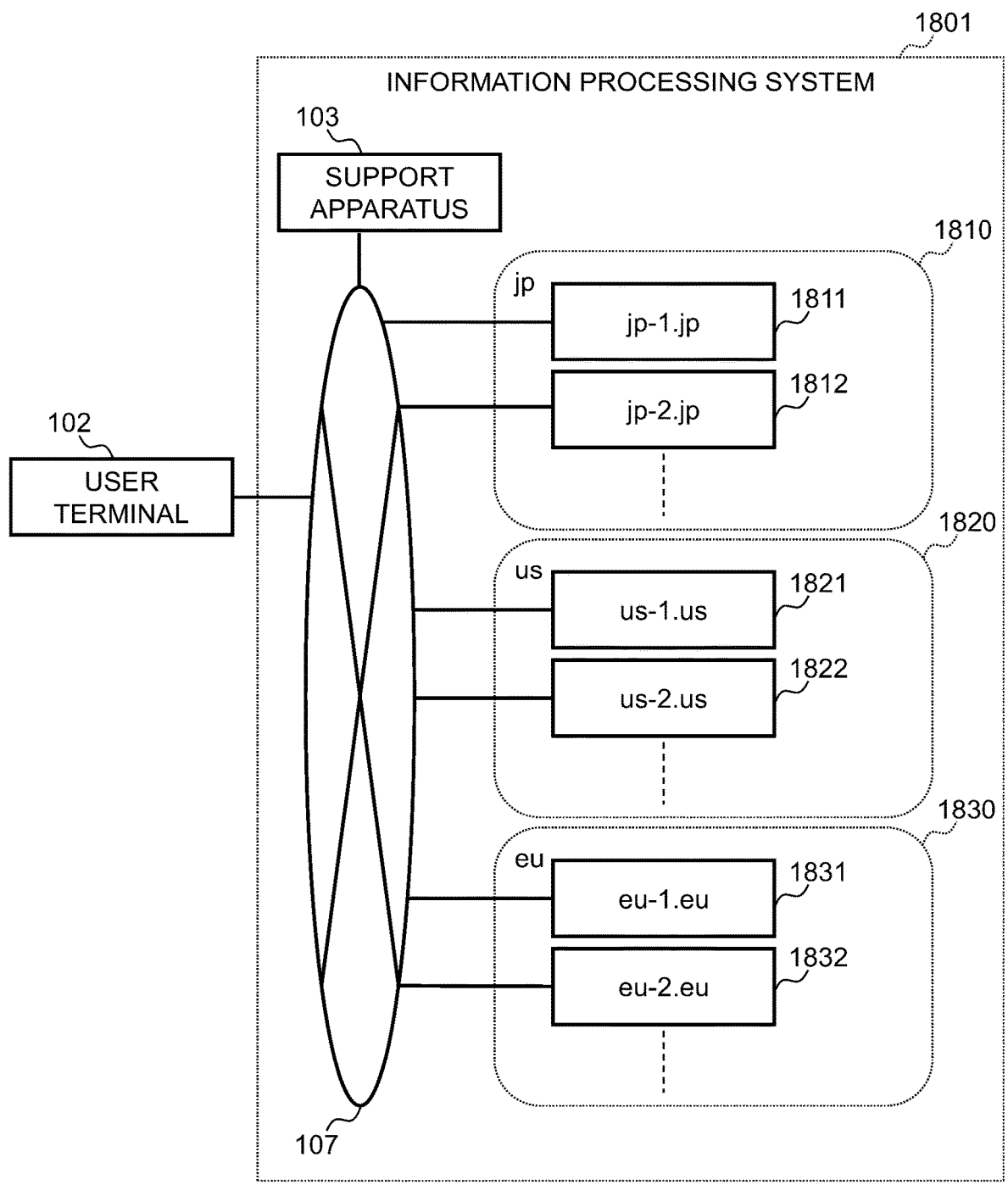
FIG. 18 is a configuration diagram showing an example of a configuration of an information processing system according to Embodiment 3.

FIG. 18 is a configuration diagram showing an example of a configuration of an information processing system according to Embodiment 3. In FIG. 18, the information processing system 1801 includes a support apparatus 103, and three or more locations 1810, 1820 and 1830 on an upper tier. The location 1810 includes a plurality of locations 1811, 1812, . . . on a lower tier. The location 1820 includes a plurality of locations 1821, 1822, . . . on the lower tier. The location 1830 includes locations 1831, 1832, . . . on the lower tier. The locations 1811 to 1832 on the lower tier each include a management apparatus 104, one or more data flow processing apparatuses 105, and one or more data storage apparatuses 106. The user terminal 102, the support apparatus 103, the locations 1810, 1820 and 1830 on the upper tier, and the locations 1811 to 1832 on the lower tier are coupled to each other via a network 107. Note that each of the locations 1811 to 1832 does not necessarily include one or more data storage apparatus 106, which may be included in the upper locations 1810 to 1830, or in the information processing system 1801, and be accessible from each of the locations 1811 to 1832. The number of upper locations 1810 to 1830 may be more or less than three.

Here, the location 1810 is managed as what has a location name "jp", the location 1820 is managed as what has a location name "us", and the location 18030 is managed as what has a location name "eu" The locations 1811, 1812, . . . belonging to the location 1810 are managed as what have a location name "jp-i.jp", 1821, 1822, . . . belonging to the location 1820 are managed as what have a location name "us-i.us", and 1831, 1832, . . . belonging to the location 1830 are managed as what have a location name "eu-i.eu".

In the case where the locations have the tiered structure and the process is executed in any of the locations 1811, 1812, . . . in the location 1810 on the upper tier, the user may designate the location name using a wildcard, such as *.jp in the transfer steps 261 and 262 in FIG. 17, or designate the location name simply by jp, during data flow creation. For example, in the case where the location is designated by *.jp, the data flow processing apparatus 105 belonging to each location in jp selects the area intended to be assigned, from among the areas designated to be executed at the location (jp-x.jp) to which the own apparatus belongs, and the areas designated to be executed at the location (*.jp) 1810 on the upper tier, in step S1201 for selecting the area intended to be assigned in the assigned area determination sequence shown in FIG. 12. Also in the determination of presence or absence of an unassigned area (step S1210 in FIG. 12), presence or absence of an unassigned area is determined among the areas designated to be executed at the location (jp-x.jp) 1811 to which the own apparatus belongs, or the location (*.jp) 1810 on the upper tier.

It is only required that one or more management apparatuses 104 reside in the information processing system 1801. The one or more apparatuses may reside in the locations 1811 to 1832 on the lower tier or in each of the locations 1810, 1820 and 1830 on the upper tier. The management apparatuses 104 cooperate with each other, and uniquely determine the data flow processing apparatuses 105 assigned the corresponding areas.

According to this embodiment, in a case where the amount of processing resources are different among the locations 1811 to 1832, the user is not required to consider the resource configuration at each location, and the data flow processing apparatus 105 at each location can uniquely determine the data flow processing apparatuses 105 assigned the respective areas, and execute the data flow. Accordingly, each input data item is converted into transferrable data items, which can achieve effective utilization of resources, within a data transferrable range, in conformity with the secrecy of data to be treated. For example, even in a case where what has a fragile amount of resources and what has a large amount of resources reside in a mixed manner among the locations 1811, 1812, . . . , designation of the location 1810 on the upper tier allows the data flow processing apparatuses 105 at locations among the locations 1811, 1812, . . . belonging to the location 1810 to execute processes that match the amount of resources.

In this embodiment, the example of two tiers is described. The number of tiers is not limited to two. The number of tiers may be different with respect to each upper tier. The tier may be geographical tier, or logical tier (e.g., conforming to the department configuration in the company).

Embodiment 4

In this embodiment, an example is described where in each data flow processing apparatus 105, data flow execution and intermediate data transfer between the data flow processing apparatuses 105 are executed in different processes.

Figure 19:
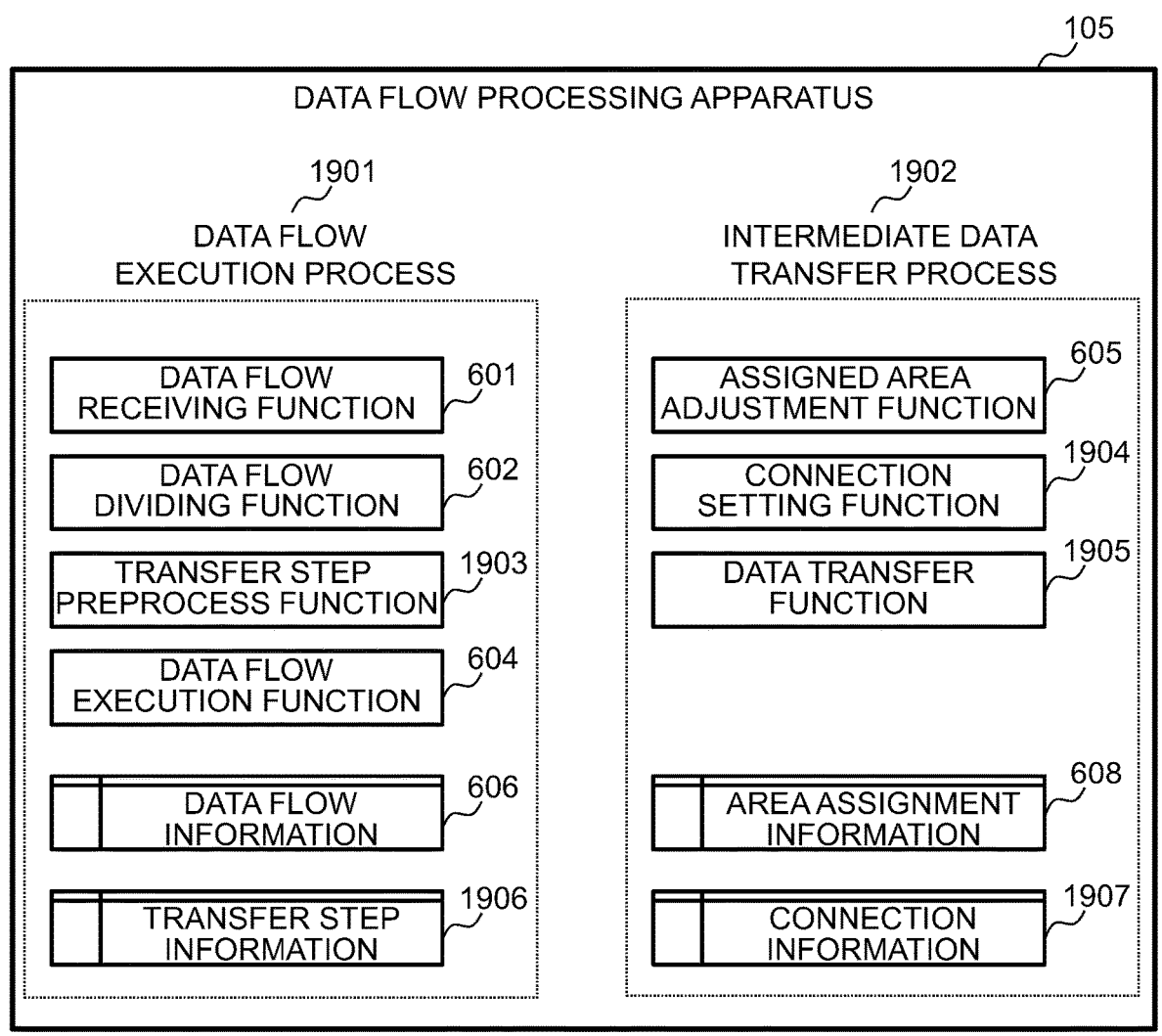
FIG. 19 is a configuration diagram showing an example of a configuration of a data flow processing apparatus according to Embodiment 4.

FIG. 19 is a configuration diagram showing an example of a data flow processing apparatus according to Embodiment 4. For the sake of clarity, in FIG. 19, each function included and data recorded in the data flow processing apparatus 105 are illustrated in association with the data flow execution process 1901 for executing the data flow and the intermediate data transfer process 1902 having a role of intermediate data transfer.

In FIG. 19, the data flow execution process 1901 includes a data flow receiving function 601, a data flow dividing function 602, a transfer step preprocess function 1903, a data flow execution function 604, a data flow information 606, and a transfer step information 1906. The intermediate data transfer process 1902 includes an assigned area adjustment function 605, a connection setting function 1904, a data transfer function 1905, an area assignment information 608, and connection information 1907.

Here, the transfer step preprocess function 603 shown in Embodiment 1 is divided into the transfer step preprocess function 1903 and the connection setting function 1904. The transfer step information 607 is divided into the transfer step information 1906 and the connection information 1907. The data transfer function 1905 cooperates with the data flow execution process 1901, and transmits and receives intermediate data between the intermediate data transfer processes 1902, and transfers the intermediate data between the data flow processing apparatuses 105.

FIG. 20 is a configuration diagram showing an example of a configuration of transfer step information according to Embodiment 4. In FIG. 20, the transfer step information 1906 records a transfer step ID 2001, a transfer-source area ID 2002, a transfer-source area ID 2003, a transfer step type 2004, a connection ID 2005 with the intermediate data transfer process, and an intermediate data type 2006.

In this embodiment, when the data flow processing apparatus 105 receives information on the data flow 201, and the process of establishing the communication connection shown in FIG. 13 is executed, in step S1302 the transfer step ID 2001, the transfer-source area ID 2002, transfer-source area ID 2003, and the transfer step type 2004 in the transfer step information 1906 record information similar to that recorded in the transfer step ID 901, the transfer-source area ID 902, the transfer-destination area ID 904, and the transfer step type 906 in the transfer step information 607 shown in FIG. 9. The connection ID 2005 with the intermediate data transfer process records, for example, information "t01".

FIG. 21 is a configuration diagram showing an example of a configuration of connection information according to Embodiment 4. In FIG. 21, the connection information 1907 records a transfer step ID 2101, a connection ID 2102 with the data flow execution process, a connection ID 2103 with the coupling destination, a transfer-source IP address 2104, a transfer-destination IP address 2105, and a transfer step type 2106.

The connection ID 2103 with the coupling destination is an identifier for communication connection with the transmission source of the intermediate data, or the transmission-destination data flow processing apparatus 105. Similar to Embodiment 1, this communication connection is established by execution of the process for establishing the communication connection shown in FIG. 13. Note that the transfer step ID 2001, the transfer-source IP address 2104, the transfer-destination IP address 2105, and the transfer step type 2106 in the connection information 1907 record information similar to the transfer step ID 901, the transfer-source IP address 903, the transfer-destination IP address 905, and the transfer step type 906 in the transfer step information 607 shown in FIG. 9.

Figure 22:
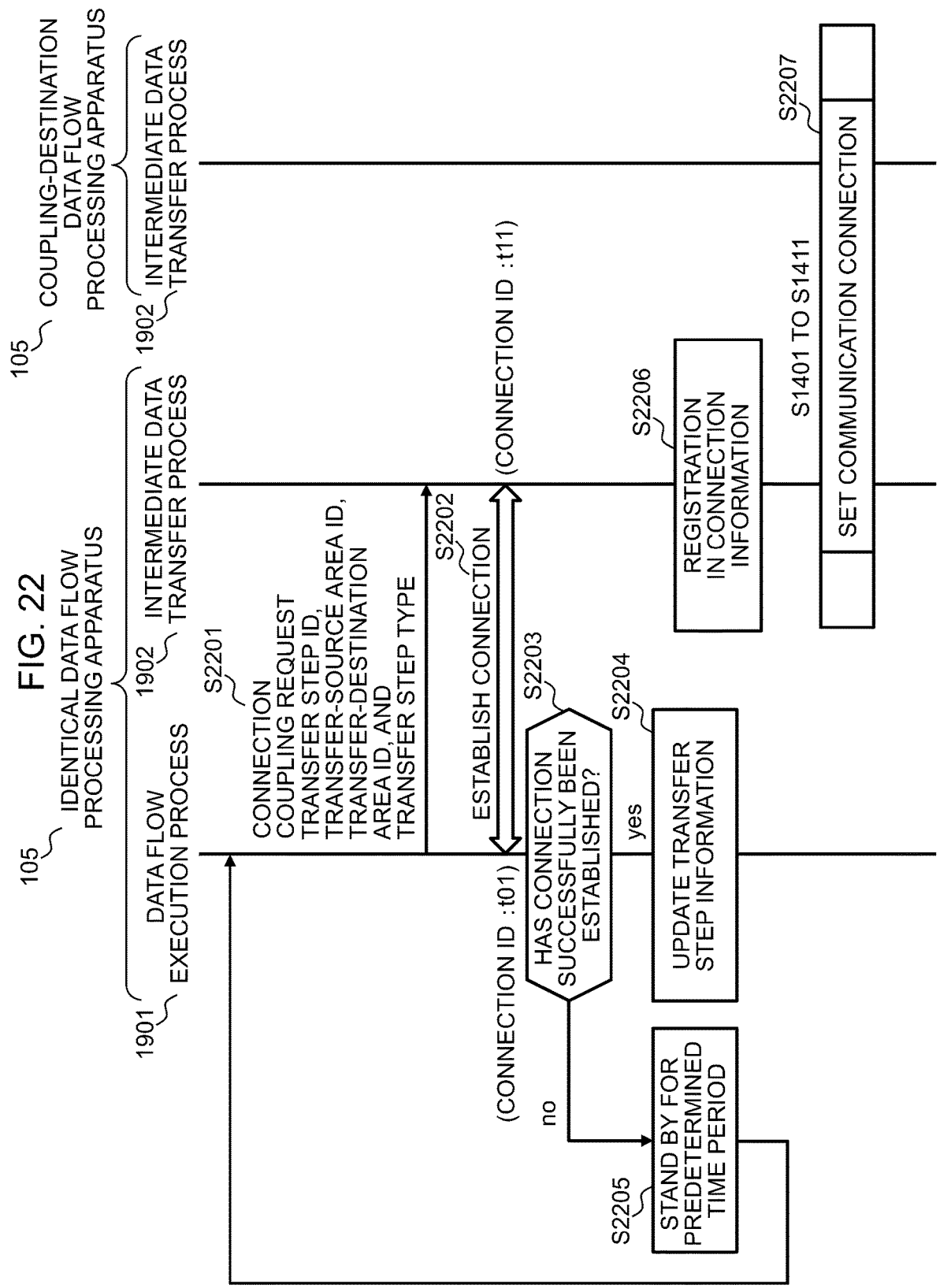
FIG. 22 is a sequence diagram showing an example of a communication connection setting sequence according to Embodiment 4.

FIG. 22 is a sequence diagram showing an example of a communication connection setting sequence according to Embodiment 4. In this embodiment, data flow execution and intermediate data transfer are executed in different processes between the data flow processing apparatuses. To achieve this, a communication connection is established between the data flow processing apparatus that executes the data flow execution process 1901, and the data flow processing apparatus that executes the intermediate data transfer process 1902.

In FIG. 22, the transfer step preprocess function (a function divided from the transfer step preprocess function 603) 1903 of the data flow processing apparatus 105 that executes the data flow execution process 1901 transmits a connection coupling request that includes the transfer step ID, the transfer-source area ID, the transfer-destination area ID and the transfer step type, to the intermediate data transfer process 1902 of the identical data flow processing apparatus 105 (S2201), and establishes a connection between the data flow execution process 1901 and the intermediate data transfer process 1902 (S2202).

Next, the transfer step preprocess function 1903 determines whether the connection has successfully been established or not (S2203). When the connection has successfully been established (Yes in S2203), the transfer step preprocess function 1903 updates the transfer step information 1906 (S2204). Specifically, the transfer step preprocess function 1903 records, for example, information "t01" in the connection ID 2005 with the intermediate data transfer process in the transfer step information 1906. When establishment of the connection has failed (No in S2203), the transfer step preprocess function 1903 stands by for a predetermined time period (S2205), and subsequently, transmits again a connection coupling request to the intermediate data transfer process 1902 of the identical data flow processing apparatus 105 (S2201).

The connection setting function 1904 establishes a connection (S2202), and then registers the transfer step ID 2101, the connection ID 2102 with the data flow execution process 1901, the transfer-source IP address 2104, the transfer-destination IP address 2105, and the transfer step type 2106, in the connection information 1907 (S2206). The transfer-source IP address 2104 and the transfer-destination IP address 2105 can be identified respectively from the transfer-source area ID and the transfer-destination area ID included in the connection coupling request, on the basis of the area assignment information 608.

Next, the connection setting function 1904 performs setting of the communication connection with the coupling-destination data flow processing apparatus 105 (S2207). Setting of the communication connection is performed similarly to the communication connection setting sequence shown in FIG. 14. Note that in step S1411 in FIG. 14, the connection ID with the coupling destination is recorded as, for example, "s01" in the connection ID 2103 with the coupling destination in the connection information 1907, instead of the transfer step information 1906.

Figure 23:
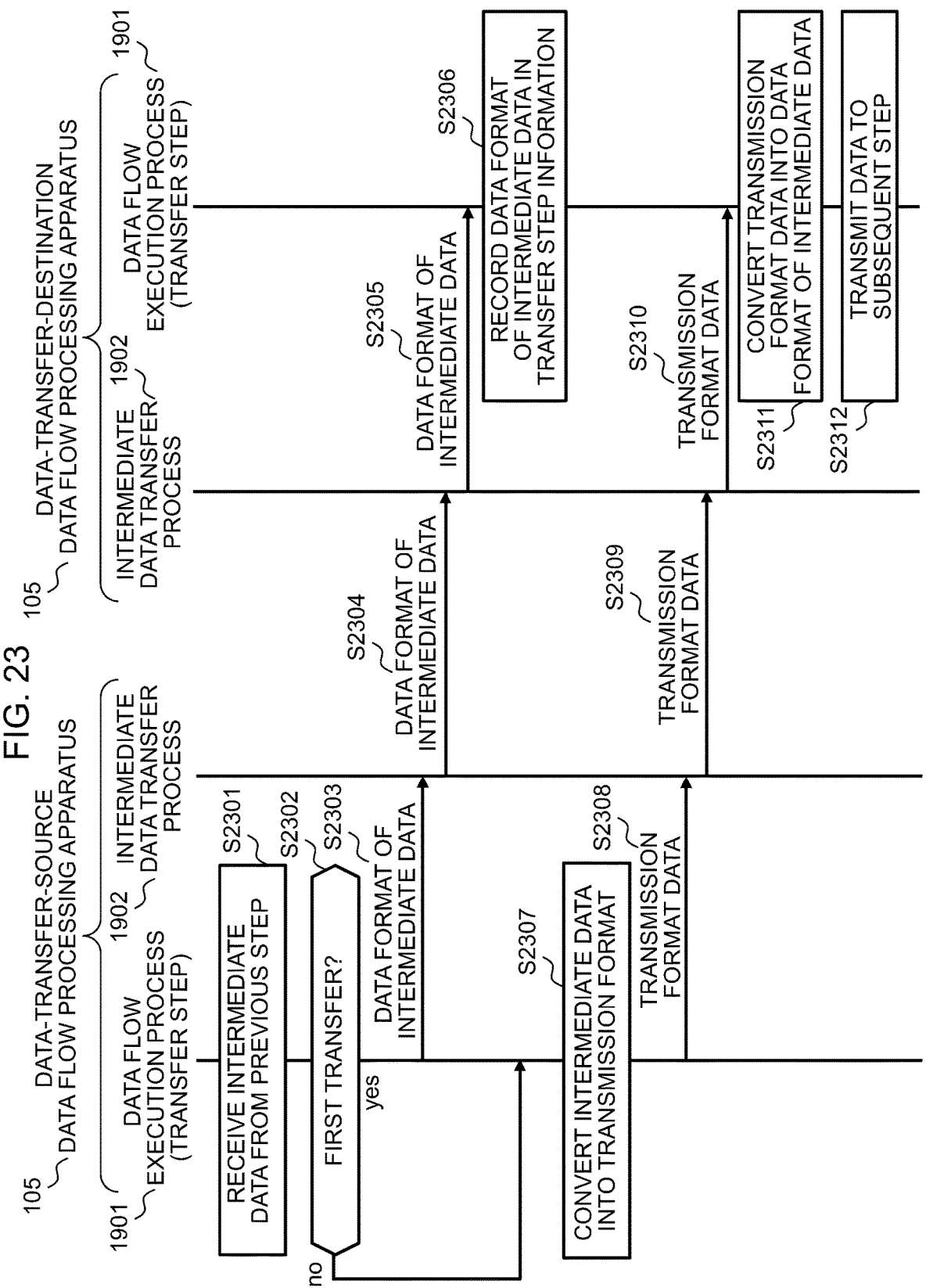
FIG. 23 is a sequence diagram showing an example of an intermediate data transfer sequence according to Embodiment 4.

FIG. 23 is a sequence diagram showing an example of an intermediate data transfer sequence according to Embodiment 4. The intermediate data transfer and the notification about the intermediate data format are executed in the transfer step when the data flow execution function 604 executes the data flow. Such communication is executed using each communication connection established through the communication connection setting sequence.

In FIG. 23, for example, upon receipt of information on the data flow 202, the data flow execution process 1901 in the data-transfer-source data flow processing apparatus 105 receives the intermediate data from the previous step, as the process in the data-transfer-source transfer step 241-1 (S2301), determines whether the transfer is the first one or not (S2302). When the transfer is the first one (Yes in S2302), this process transmits information on the intermediate data format to the data-transfer-destination data flow processing apparatus 105 via the intermediate data transfer process 1902 (S2303 and S2304).

The intermediate data transfer process 1902 in the data-transfer-destination data flow processing apparatus 105 transfers the received information about the intermediate data format to the data flow execution process 1901 in the data-transfer-destination data flow processing apparatus 105 (S2305). The data flow execution process 1901 records the information about the data format of the intermediate data to the transfer step information 1906 (S2306).

Next, the data flow execution process 1901 of the data-transfer-source data flow processing apparatus 105 converts the intermediate data into the data in the transmission format (S2307), for example, serialized information, and transfers the converted data to the transfer-destination data flow processing apparatus 105 via the data-transfer-source intermediate data transfer process 1902 (S2308 and S2309).

The intermediate data transfer process 1902 in the transfer-destination data flow processing apparatus 105 transfers the received data in the transmission format to the data flow execution process 1901 in the data-transfer-destination data flow processing apparatus 105 (S2310). The data-transfer-destination data flow execution process 1901 converts the received data in the transmission format into the data format of the intermediate data (S2311), and transmits the data to the subsequent step (S2312).

Note that processes other than the transfer step in the data flow are normally executed by data flow execution function 604 of each data flow processing apparatus 105.

Note that the communication connection is not necessarily set. Connection less communication may be used instead. The timing of the notification in the intermediate data format is not limited to that described in this embodiment.

In this embodiment, the intermediate data transfer is performed by the intermediate data transfer process 1902. Accordingly, the data flow execution process 1901 executes data transfer with the intermediate data transfer process 1902 in the transfer step, thereby allowing the data transfer to be achieved between the data flow processing apparatuses 105. According to this embodiment, in the process of the data flow execution function 604, the processes of the data input part (i.e., "DATA INPUT 1" to "DATA INPUT 3") and the processing part (i.e., "PROCESS 1" to "PROCESS 4") in the data flow 202 can be performed by the data flow execution process (i.e., the execution process) 1901, and the processes of the divided transfer part (i.e., "TRANSFER 1" to "TRANSFER 2") can be performed by the intermediate data transfer process (i.e., the transfer process) 1902, thereby allowing the load on the data flow execution function 604 to be reduced.

It is conceivable that the execution of the data flow is executable by various languages and applications. The data flow processing function and the intermediate data transfer function are separated from each other, and a data transfer process is added to the intermediate data transfer process is added to various languages and applications, thereby allowing cooperation with the data flow processing apparatuses 105 and execution of a single data flow. The data transfer between the intermediate data transfer process 1902 and the data flow execution process 1901 can be achieved by a typical method, such as WebSocket communication, for example.

Alternatively, through use of the container technique, the data flow execution process 1901 and the intermediate data transfer process 1902 can be executed by different containers. For example, Kubernetes® can integrally deal with one or more containers in a unit called a Pod, and the data flow processing apparatus 105 can be achieved by a Pod that includes a container for executing the data flow, and a container for transferring the intermediate data.

Embodiment 5

In Embodiment 1, the user inserts the transfer step into the data flow. In this embodiment, a method of recommending the transfer step insertion position is described.

The user designs the data flow using an information processing apparatus that includes a data flow design function provided with a GUI, a data flow execution function, and a division position recommendation function.

Figure 24:
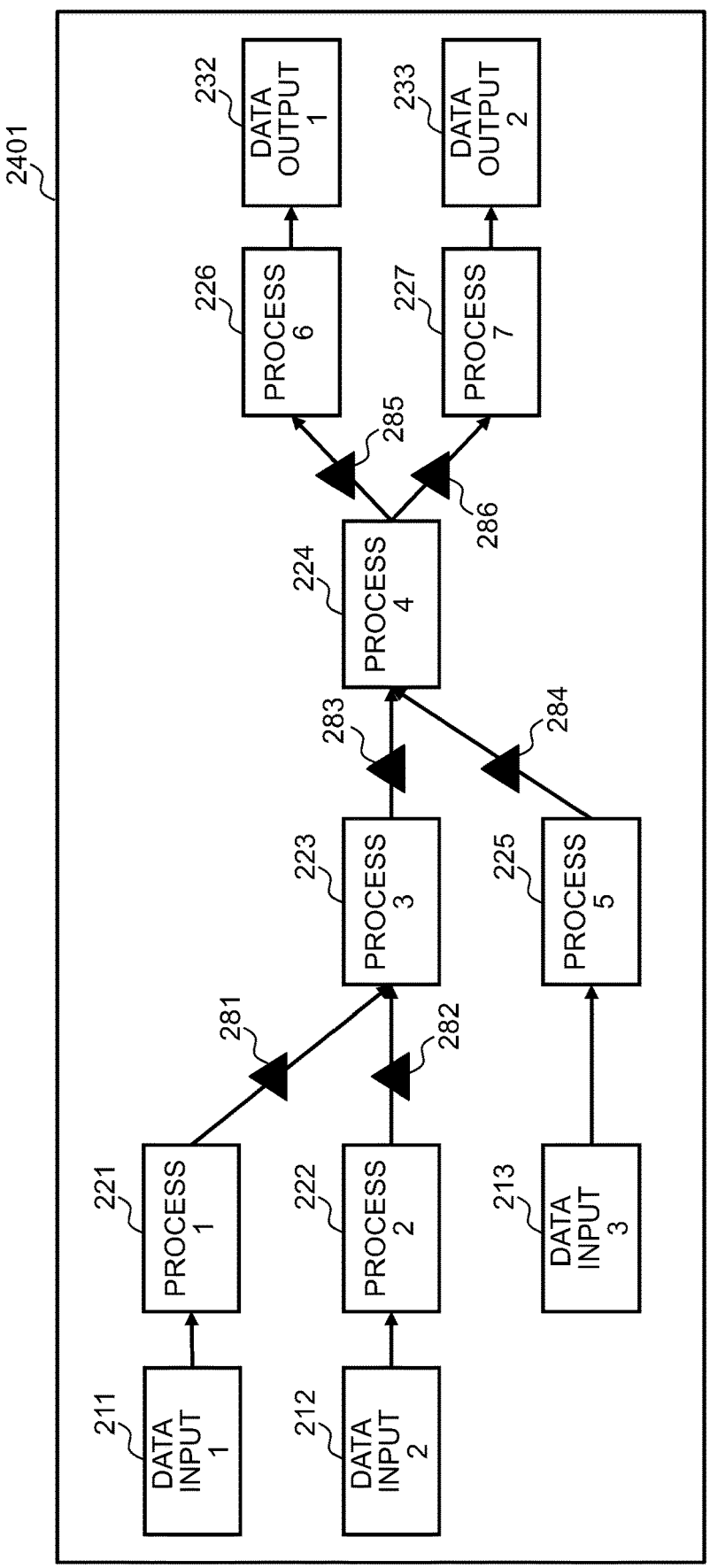
FIG. 24 is a configuration diagram showing an example where candidates for transfer step insertion position are inserted into a data flow according to Embodiment 5.

FIG. 24 is a configuration diagram showing an example where candidates for transfer step insertion positions are inserted according to Embodiment 5. In FIG. 24, a data flow 2401 is information generated by the user terminal 102 on the basis of the operation of the user, and includes: a first data input (i.e., "DATA INPUT 1") 211, a second data input (i.e., "DATA INPUT 2") 212 and a third data input (i.e., "DATA INPUT 3") 213, as start points for data input; a first process (i.e., "PROCESS 1") 221 to a seventh process (i.e., "PROCESS 7") 227, as processes for executing data statistical processing, data anonymization process and the like; and a first data output (i.e., "DATA OUTPUT 1") and a second data output (i.e., "DATA OUTPUT 2") 232 and 233 as end points for data output.

Here, in a process of generating the information on the data flow 2401, the user terminal 102 as the information processing apparatus that includes the data flow design function, the data flow execution function, and the division position recommendation function inserts candidate points 281 to 286 that are the merger points between processes, and the branch points between processes, and serve as candidates for insertion of the transfer steps as the transfer candidates. The candidate point 281 is inserted between the first process (i.e., "PROCESS 1") 221 and the third process (i.e., "PROCESS 3") 223. The candidate point 282 is inserted between the se (i.e., "PROCESS 2") 222 and the third process (i.e., "PROCESS 3") 223. The candidate point 283 is inserted between the third process (i.e., "PROCESS 3") 223 and the fourth process (i.e., "PROCESS 4") 224. The candidate point 284 is inserted between the fifth process (i.e., "PROCESS 5") 225 and the fourth process (i.e., "PROCESS 4") 224. The candidate point 285 is inserted between the fourth process (i.e., "PROCESS 4") 224 and the sixth process (i.e., "PROCESS 6") 226. The candidate point 286 is inserted between the fourth process (i.e., "PROCESS 4") 224 and the seventh process (i.e., "PROCESS 7") 227.

Figure 25:
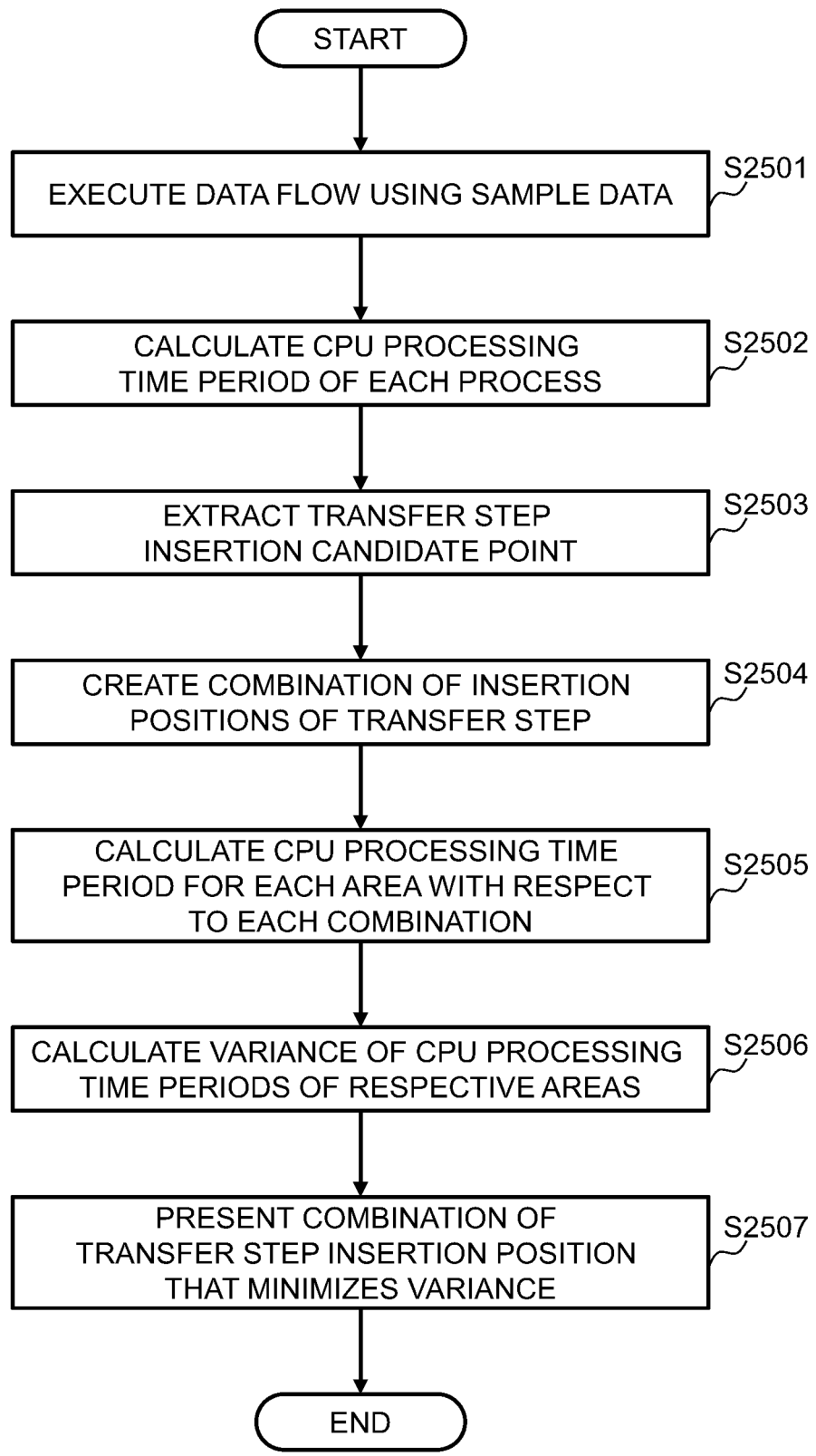
FIG. 25 is a flowchart showing an example of a process of a division position recommendation function according to Embodiment 5.

FIG. 25 is a flowchart showing an example of a process of a division position recommendation function according to Embodiment 5. In FIG. 25, the data flow execution function of the user terminal 102 executes the processes (i.e., "PROCESS 1" to "PROCESS 7") recorded in the data flow 2401 (S2501) using the sample data (i.e., sample data items corresponding to "INPUT 1" 211 to "INPUT 3" 213) generated on the basis of the operation of the user, and calculates the CPU processing time periods of the respective processes (S2502). Subsequently, the division position recommendation function of the user terminal 102 extracts the candidate points 281 to 286 serving as transfer step insertion candidates, on the basis of the information of the data flow 2401 (S2503).

Next, the division position recommendation function of the user terminal 102 creates combinations of transfer step insertion positions on the basis of the preliminarily designated number of areas (S2504), and calculates a CPU processing time period for each area with respect to each combination (S2505). Specifically, the division position recommendation function of the user terminal 102 calculates the total value of the CPU processing time periods of the processes included in the respective areas.

Next, the division position recommendation function of the user terminal 102 calculates the variance of the CPU processing time periods of the respective areas (S2506), selects a combination that minimizes the calculated variance, and presents the selected combination, as the recommended transfer step insertion position (S2507).

In step S2502, the division position recommendation function of the user terminal 102 calculates not only the CPU processing time periods but also the data transfer amount at the transfer step insertion candidate points 281 to 286. In step S2507, this function may present the variance of the CPU processing time periods on an area-by-area basis, and a combination having the minimum weighted sum of the data transfer amount total value.

One or more thresholds and the upper limit number of areas for the CPU processing time period for each area may be preliminarily set, the processes in steps S2504 to S2507 may be repeated while increasing the number of areas until the average value or the maximum value of the CPU processing time periods for each area becomes equal to or smaller than the set threshold, or the number of areas reaches the upper limit value, with respect to the combination selected in step S2507, and the finally selected combination of the transfer step insertion positions may be presented to the user.

In the presentation of the transfer step recommendation position (step S2507), the division position recommendation function may present upper one or more combinations, thus allowing the user to select the combination.

In the creation of the combination of the transfer step insertion positions in step S2504, the transfer step may be prohibited from being inserted into one or some or all of input lines to one merge position (e.g., "PROCESS 3") of processes. Likewise, the transfer step may be prohibited from being inserted into one or some or all of output lines from one process.

In this embodiment, each data flow processing apparatus 105 may have a configuration that includes the division position recommendation function. Here, each data flow processing apparatus 105 further includes the division position recommendation function that calculates the CPU processing time periods of processing parts (i.e., "PROCESS 1"

to "PROCESS 7") on the basis of the sample data corresponding to the data flow 2401. The division position recommendation function extracts each of the transfer candidate parts (i.e., candidate points 281 to 286) belonging to the data flow 2401, creates a plurality of combinations of one or more transfer candidate parts on the basis of each of the extracted transfer candidate parts and the number of areas set as the number according to which the data flow 2401 is divided into multiple areas as many as the number, calculates the CPU processing time periods for each of the areas obtained by dividing the data flow 2401, on the basis of the transfer candidate parts belonging to the created combinations, selects the combination having the calculated CPU processing time period equal to or less than the setting value from among the combinations of the transfer candidate parts, for example, the combination having the minimum variance of the calculated CPU processing time periods, updates the data flow 2401 while adopting each transfer candidate part belonging to the selected combination as the transfer part (i.e., the transfer step) for data transfer between the processing parts, and outputs the updated data flow 2401 to the data flow dividing function 602. The data flow dividing function 602 divides the range recorded in the updated data flow 2401 into a plurality of areas on the basis of the transfer part, and divides the transfer part belonging to the updated data flow 2401 into a plurality of divided transfer parts, and distributes the divided transfer part to the corresponding areas.

Accordingly, even when the data flow 2401 includes no transfer step, each data flow processing apparatus 105 can update the data flow 2401 while adopting each transfer candidate part selected from among the transfer candidate parts (i.e., the candidate points 281 to 286) residing in the data flow 2401 as the transfer part (i.e., the transfer step) for data transfer between the processing parts, divide the updated data flow 2401 to a plurality of areas on the basis of the transfer part, and divide the transfer part into a plurality of divided transfer parts, and distribute the divided transfer part to the corresponding areas. As a result, when a plurality of transfer candidate parts (i.e., candidate points 281 to 286) reside in the data flow 2401 even without the user's designation of the position of the transfer step, each data flow processing apparatus 105 can automatically divide the data flow 2401 into a plurality of areas.

Figure 26:
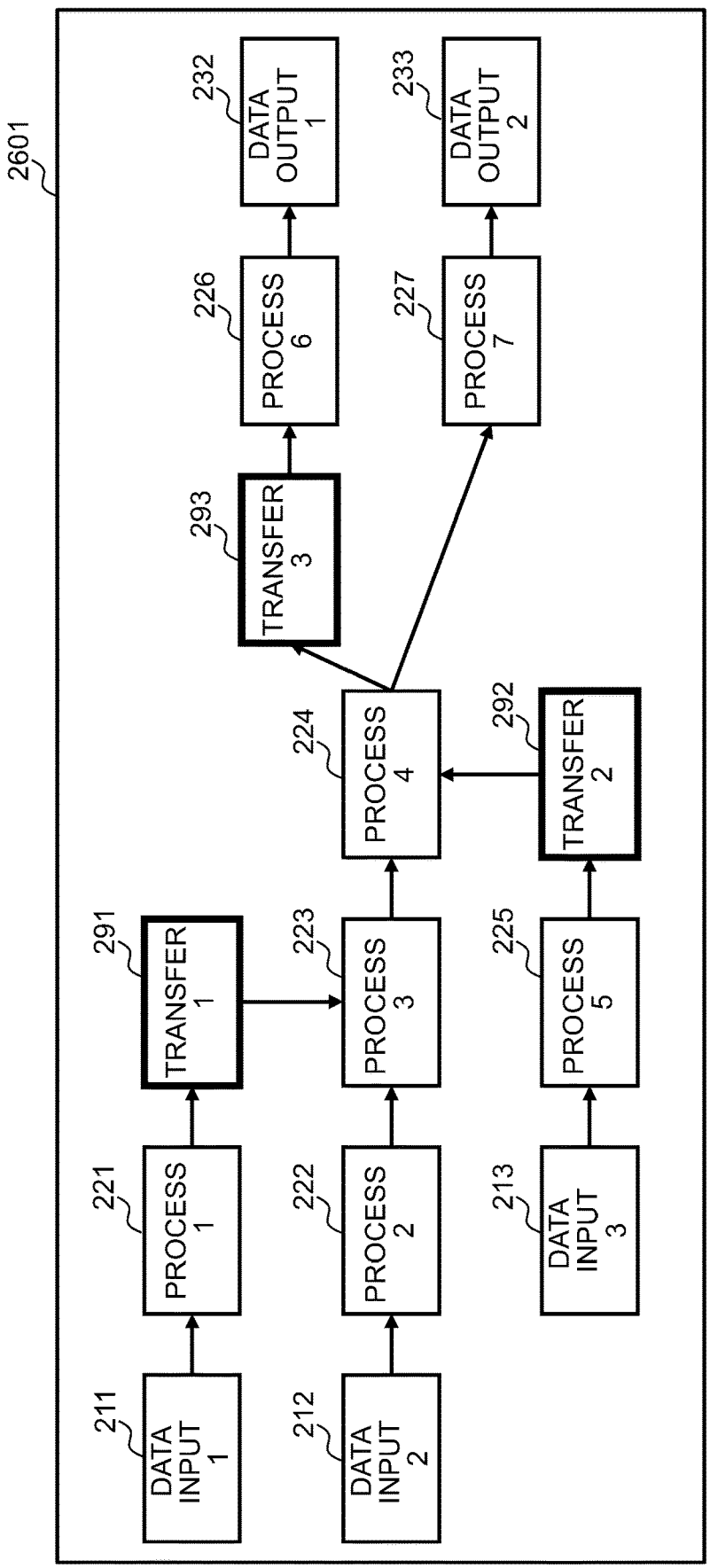
FIG. 26 is a configuration diagram showing an example where transfer step insertion positions are presented in the data flow according to Embodiment 5.

FIG. 26 is a configuration diagram showing an example where transfer step insertion positions are presented in the data flow according to Embodiment 5. In FIG. 26, the data flow 2601 is information generated by the user terminal 102 on the basis of the operation of the user, and is displayed on the screen of the output device 305 by the division position recommendation function of the user terminal 102. The data flow 2601 includes: a first data input (i.e., "DATA INPUT 1") 211, a second data input (i.e., "DATA INPUT 2") 212 and a third data input (i.e., "DATA INPUT 3") 213, as start points for data input; a first process (i.e., "PROCESS 1") 221 to seventh process (i.e., "PROCESS 7") 227, as processes for executing data statistical processing, data anonymization process and the like; a first data output (i.e., "DATA OUTPUT 1") 232 and a second data output (i.e., "DATA OUTPUT 2") 233 as end points of data output; and a first transfer step (i.e., "TRANSFER 1") 291 to a third transfer step (i.e., "TRANSFER 3") 293 as transfer steps serving as switching points of the data flow processing apparatuses.

Here, the first transfer step (i.e., "TRANSFER 1") 291 is inserted as the transfer step (i.e., the transfer part) into the candidate point 281 indicated in the data flow 2401 in FIG. 24. The second transfer step (i.e., "TRANSFER 2") 292 is inserted as the transfer step (i.e., the transfer part) into the candidate point 284 indicated in the data flow 2401 in FIG. 24. The third transfer step (i.e., "TRANSFER 3") 293 is inserted as the transfer step (i.e., the transfer part) into the candidate point 285 indicated in the data flow 2401 in FIG. 24.

Note that when displaying the transfer step insertion position, the division position recommendation function of the user terminal 102 may display the CPU processing time period and the output data amount of each process.

According to this embodiment, the recommendation position of the transfer step insertion position can be displayed in the data flow. From among one or more combinations of the transfer step insertion positions, the transfer step insertion position that satisfies the condition (for example, the CPU load in each area is uniform) can be selected.

Thus, the present invention has specifically been described based on the embodiments. However, the present invention is not limited to the embodiments described above, and may be variously changed in a range without departing from the gist. For example, the aforementioned embodiments have been described in detail for clearly illustrating the present invention. There is no limitation to what includes all the configurations described above. A part of the configurations of the embodiments described above may be subjected to addition, removal, or replacement of another component.

In each diagram, the control lines and information lines required for description are indicated. Not all the control line and information lines to be implemented are not necessarily indicated. For example, it is conceivable that almost all the components are coupled to each other in actuality.

The embodiments described above may be solely implemented, or some or all of them may be combined and implemented.

In the aforementioned description, the configuration elements (e.g., each function, database and element step, etc.) are not necessarily required unless specifically stated and conceived to be clearly necessary. Some configuration elements (e.g., the support apparatus 103) may also have a function of another configuration element (e.g., the management apparatus 104).

The number of data items recorded by each information processing apparatus may be larger or smaller than the number of items indicated in the embodiment. The number of configuration elements (e.g., the user terminal 102, the support apparatus 103, the management apparatus 104, the data flow processing apparatus 105, the data storage apparatus 106, etc.) is not limited to the number described in each embodiment, and may be larger or smaller.

What is claimed is:

1. An information processing system comprising one or more information processing apparatuses to process information,
   wherein the information processing apparatus includes:
   a division function configured to divide processing information into a plurality of pieces, under a division condition that designates parallel processing among the information processing apparatuses, the processing information indicating a data processing procedure from a plurality of start points to one or more end points;
   a determination function configured to uniquely determine an assignee of each piece of the processing information divided by the division function, as any of the information processing apparatuses;

an execution function configured to execute a process in the information processing apparatus determined by the determination function; and a division position recommendation function that calculates at least one item selected between CPU processing time periods of a plurality of processing parts and a data output amount, based on sample data that corresponds to the processing information, wherein the division position recommendation function extracts each of the transfer candidate parts belonging to the sample data, creates one or more combinations of one or more transfer candidate parts from the extracted transfer candidate parts, divides the processing information into a plurality of areas, with respect to each combination of the transfer candidate parts, based on the transfer candidate part belonging to the combination of the transfer candidate parts, calculates a total value of the CPU processing time periods with respect to each area of the created combinations, selects the combination of the transfer parts from among the combinations of the transfer candidate parts, based on at least one of the calculated total value of the CPU processing time periods and a data transfer amount by the transfer candidate parts, updates the processing information so as to adopt each transfer candidate part belonging to the selected combination of the transfer parts, as the transfer part that performs data transfer between the processing parts, and outputs the updated processing information to the division function, and upon receiving the updated processing information, the division function divides a range in which the updated processing information is recorded, into a plurality of areas, based on the transfer part, and divides the transfer part into a plurality of divided transfer parts, and distributes the divided transfer parts to the respective areas.

2. The information processing system according to claim 1, wherein the processing information includes: a plurality of processing parts that are disposed between each of the start points and the end point, and sequentially process the data from at least one start point among the start points; and one or more transfer parts that are disposed between certain processing parts among the plurality of processing parts, and execute data transfer between the certain processing parts, and for dividing the processing information, the division function divides a range where the processing information is recorded, into a plurality of areas, based on the transfer part, and divides the transfer part into a plurality of divided transfer parts, allocates the divided transfer parts to the respective areas, couples one divided transfer part among the divided transfer parts to the processing part that serves as a transfer source and belongs to the same area as the one divided transfer part does, and couples another divided transfer part among the divided transfer parts to the processing part that serves as a transfer destination and belongs to the same area as the other divided transfer part does.

3. The information processing system according to claim 2, wherein each of the areas includes the corresponding start point, the processing part and the divided transfer part, and when each of the information processing apparatuses determined by the determination function is assigned a process for the corresponding start point and the processing part as a process for the corresponding area, the execution function receives the data from the start point, and processes the received data, and when each of the information processing apparatuses determined by the determination function is assigned a process for the divided transfer part as the process for the corresponding area, the execution function executes data transfer between the information processing apparatuses determined by the determination function.

4. The information processing system according to claim 2, wherein the determination function stores distance information that indicates a total of distances between the information processing apparatuses, in association with the information processing apparatuses, identifies one or more sets of information processing apparatuses that make the total of the distances between the information processing apparatuses minimum, based on the stored distance information, and determines each of the identified sets of information processing apparatuses as an assignee of the area that includes the one divided transfer part among the plurality of areas or as an assignee of the area that includes the other divided transfer part.

5. The information processing system according to claim 2, wherein one determination function among the determination functions belonging to the information processing apparatuses sequentially selects one information processing apparatus from among the information processing apparatuses, sequentially allocates the selected one information processing apparatus as the assignee of the corresponding area, records the corresponding area and the one information processing apparatus in area assignment information in association with each other, and distributes the recorded area assignment information to each of the information processing apparatuses.

6. The information processing system according to claim 2, further comprising a management apparatus configured transmit and receives information to and from the information processing apparatuses, wherein the management apparatus includes area assignment information for the management apparatus in which a division identifier for uniquely identifying each of the areas, and an apparatus identifier for uniquely identifying each of the information processing apparatuses assigned the corresponding area are recorded in association with each other, the determination function belonging to the corresponding information processing apparatus transmits, to the management apparatus, a registration request for allocating a designated area among the areas to the information processing apparatus to which the determination function belongs, upon receipt of the registration request, the management apparatus refers to the area assignment information for the management apparatus, based on the received registration request, registers the division identifier of the designated area, and the apparatus identifier of what has issued the request, in the area assignment information for the management apparatus, in association with each other, under a condition indicating that the assignee of the designated area is unregistered, based on a result of the reference, transmits, to the determination function, a response indicating registration as the assignee of the designated area, and when the assignee of the designated area has been registered, the management apparatus transmits, to the determination function, a response indicating that registration as the assignee of the designated area is not allowed, the determination function having received the response registers the designated area as an assigned area of the information processing apparatus to which the determination function belongs, under a condition designating that the response indicates registration as the assignee of the designated area, and the assignee of the designated area is uniquely determined.

7. The information processing system according to claim 2, wherein the information processing apparatuses are disposed in respective locations different from each other, when the transfer part in the processing information is assigned an execution location identifier for uniquely identifying an execution location of the information processing apparatus, the division function converts the execution location identifier into a division identifier for uniquely identifying the corresponding area, and assigns the converted division identifier to the corresponding area, and the determination function uniquely determines the information processing apparatus serving as the assignee of the corresponding area, based on the division identifier assigned to the area.

8. The information processing system according to claim 2, wherein the information processing apparatus further includes a communication function that controls communication between the information processing apparatuses determined by the determination function, and the division function assigns each of the areas a division identifier for uniquely identifying the area, the communication function stores a first division identifier for uniquely identifying the area to which the one divided transfer part belongs, as first communication information indicating the area serving as a transfer source, in association with the divided transfer part, stores a first apparatus identifier for uniquely identifying the information processing apparatus assigned a process for the area to which the one divided transfer part belongs, as second communication information identifying the information processing apparatus serving as the transfer source, in association with the divided transfer part, stores a second division identifier for uniquely identifying the area to which the other divided transfer part belongs, as third communication information indicating the area serving as a transfer destination, in association with the divided transfer part, stores a second apparatus identifier for uniquely identifying the information processing apparatus assigned a process for the area to which the other divided transfer part belongs, as fourth communication information indicating the information processing apparatus serving as the transfer destination, in association with the divided transfer part, and stores a type of communication between the information processing apparatuses as a fifth communication information indicating whether the type is transmission or reception, in association with the divided transfer part, and the execution function establishes communication connections between the information processing apparatuses with reference to the first communication information to the fifth communication information, as a preprocess before execution of a process for the divided transfer part.

9. The information processing system according to claim 1, further comprising a support apparatus that transmits and receives information to and from a user terminal and the information processing apparatuses, the support apparatus includes:

a division function for the support apparatus that, upon receipt of the processing information from the user terminal, divides a range in which the received processing information is recorded and which is to be executed by the information processing apparatus, into a plurality of areas under a division condition indicating parallel processing among the information processing apparatuses;

a determination function for the support apparatus that uniquely determines an assignee of each area divided by the division function for the support apparatus, as any of the information processing apparatuses; and a notification function for the support apparatus that notifies the determination of the assignee, and a combination of information indicating processing content for each area and an identifier of the information processing apparatus assigned the area, to each of the information processing apparatuses determined by the determination function for the support apparatus.

10. The information processing system according to claim 3, wherein the information processing apparatus includes: an execution process assigned the process for the start point and the processing part, as a process of the execution function; and a transfer process assigned the process of the divided transfer part, as a process of the execution function.

11. The information processing system according to claim 1, wherein the processing information includes: a plurality of processing parts that are disposed between each of the start points and the end point, and sequentially process the data from at least one start point among the start points; and a plurality of transfer candidate parts that are disposed between certain processing parts among the plurality of processing parts.

12. An information processing method in an information processing system that includes one or more information processing apparatuses to process information, the method comprising:

a division step of, by the information processing apparatus, dividing processing information into a plurality of pieces, under a division condition that designates parallel processing among the information processing apparatuses, the processing information indicating a data processing procedure from a plurality of start points to one or more end points;

a determination step of, by the information processing apparatus, uniquely determining an assignee of each piece of the processing information divided by the division step, as any of the information processing apparatuses;

an execution step of, by the information processing apparatus, executing a process in the information processing apparatus determined by the determination step; and a division position recommendation step of, by the information processing apparatus, calculating at least one item selected between CPU processing time periods of a plurality of processing parts and a data output amount, based on sample data that corresponds to the processing information, wherein the division position recommendation step includes extracting each of the transfer candidate parts belonging to the sample data, creating one or more combinations of one or more transfer candidate parts from the extracted transfer candidate parts, dividing the processing information into a plurality of areas, with respect to each combination of the transfer candidate parts, based on the transfer candidate part belonging to the combination of the transfer candidate parts, calculating a total value of the CPU processing time periods with respect to each area of the created combinations, selecting the combination of the transfer parts from among the combinations of the transfer candidate parts, based on at least one of the calculated total value of the CPU processing time periods and a data transfer amount by the transfer candidate parts, updating the processing information so as to adopt each transfer candidate part belonging to the selected combination of the transfer parts, as the transfer part that performs data transfer between the processing parts, and outputting the updated processing information to the division function, and upon receiving the updated processing information, the division step further includes dividing a range in which the updated processing information is recorded, into a plurality of areas, based on the transfer part, and dividing the transfer part into a plurality of divided transfer parts, and distributing the divided transfer parts to the respective areas.

13. The information processing method according to claim 12, wherein the processing information includes: a plurality of processing parts that are disposed between each of the start points and the end point, and sequentially process the data from at least one start point among the start points; and one or more transfer parts that are disposed between certain processing parts among the plurality of processing parts, and execute data transfer between the certain processing parts, and in the division step, for dividing the processing information, the information processing apparatus divides a range where the processing information is recorded, into a plurality of areas, based on the transfer part, and divides the transfer part into a plurality of divided transfer parts, allocates the divided transfer parts to the respective areas, couples one divided transfer part among the divided transfer parts to the processing part that serves as a transfer source and belongs to the same area as the one divided transfer part does, and couples another divided transfer part among the divided transfer parts to the processing part that serves as a transfer destination and belongs to the same area as the other divided transfer part does.

14. The information processing method according to claim 13, wherein each of the areas includes the corresponding start point, the processing part and the divided transfer part, and in the execution step, when each of the information processing apparatuses determined by the determination step is assigned a process for the corresponding start point and the processing part as a process for the corresponding area, the information processing apparatus receives the data from each of the start points, and processes the received data, and when each of the information processing apparatuses determined by the determination step is assigned a process for the divided transfer part as the process for the corresponding area, the information processing apparatus executes data transfer between the information processing apparatuses by the determination step.

15. The information processing method according to claim 13, wherein in the determination step, the information processing apparatus stores distance information that indicates a total of distances between the information processing apparatuses, in association with the information processing apparatuses, identifies one or more sets of information processing apparatuses that make the total of the distances between the information processing apparatuses minimum, based on the stored distance information, and determines each of the identified sets of information processing apparatuses as an assignee of the area that includes the one divided transfer part among the plurality of areas or as an assignee of the area that includes the other divided transfer part.

* * * * *